(12) United States Patent
Childs et al.

(10) Patent No.: US 7,247,370 B2
(45) Date of Patent: Jul. 24, 2007

(54) ASYMMETRIC GEL-FILLED MICROPOROUS MEMBRANES

(75) Inventors: Ronald F. Childs, Dundas (CA); Alicja M. Mika, Hamilton (CA); Jijun Ge, Boxborough, MA (US); Chris McCrory, Eden Prairie, MN (US)

(73) Assignee: McMaster University, Ontario (CA)

( * ) Notice: Subject to any disclaimer, the term of this patent is extended or adjusted under 35 U.S.C. 154(b) by 157 days.

(21) Appl. No.: 10/484,059

(22) PCT Filed: Jul. 18, 2002

(86) PCT No.: PCT/CA02/01102

§ 371 (c)(1),
(2), (4) Date: Sep. 1, 2004

(87) PCT Pub. No.: WO03/008078

PCT Pub. Date: Jan. 30, 2003

(65) Prior Publication Data

US 2005/0011826 A1    Jan. 20, 2005

Related U.S. Application Data

(60) Provisional application No. 60/306,412, filed on Jul. 20, 2001.

(51) Int. Cl.
*B32B 5/14*    (2006.01)
(52) U.S. Cl. .............. 428/310.5; 428/304.4; 210/767
(58) Field of Classification Search ............ 428/306.6, 428/310.5; 210/483, 500.27, 500.28, 500.29, 210/500.3, 500.31, 500.32, 500.33, 500.34, 210/500.35, 500.36, 500.37, 500.38, 500.41, 210/500.42, 500.43
See application file for complete search history.

(56) References Cited

U.S. PATENT DOCUMENTS

| | | | |
|---|---|---|---|
| 4,894,165 A | | 1/1990 | Fibiger et al. |
| 4,909,943 A | | 3/1990 | Fibiger et al. |
| 4,992,221 A | * | 2/1991 | Malon et al. ............ 264/41 |
| 5,049,275 A | * | 9/1991 | Gillberg-LaForce et al. ...... 210/500.27 |
| 5,236,588 A | * | 8/1993 | Zhang et al. .......... 210/500.35 |
| 5,246,587 A | | 9/1993 | Tomaschke |
| 5,254,261 A | | 10/1993 | Tomaschke et al. |
| 5,436,068 A | | 7/1995 | Kobayashi et al. |
| 5,755,964 A | | 5/1998 | Mickols |
| 5,922,203 A | | 7/1999 | Tomaschke |
| 6,063,278 A | | 5/2000 | Koo et al. |
| 6,258,276 B1 | | 7/2001 | Mika et al. |

FOREIGN PATENT DOCUMENTS

| | | |
|---|---|---|
| WO | WO 97/17129 | 5/1997 |
| WO | WO 98/17377 | 4/1998 |
| WO | WO 99/40996 | 8/1999 |
| WO | WO 00/50160 | 8/2000 |

OTHER PUBLICATIONS

Mika, A.M., et al., "a new class of polyelectrolyte-filled microfiltration membranes with environmentally contolled porosity", Journal of Membrane Science, amsterdam, nl, 108 (1995) pp. 37-56.
Yamaguchi, T., et al., "Evidence and Mechanisms of Filling Polymerization by Plasma-Induced Graft Polymerization", J. Polym. Sci. Part A. Polymer Chem. 34, 1203-1208 (1996).
Dai, W.S., et al., "Hollow fiber-supported hydrogels with mesh-size asymmetry", J. Membrane Science, 171, (2000) 79-86.
Pandey, A.K., et al., "Formation of Pore-Filled Ion-Exchange Membranes with in-situ Cross-linking: Poly(vinylbenzylammonium salt) Filled Membranes", J. Polym. Sci. Part A Polymer Chemistry, 39, (2001) 807-820.
Winnik, F. M., et al., "Polyacrylic Acid Pore-Filled/Microporous Membranes and Their Use Membrane-Mediated Synthesis of Nanocrystalline Ferrihydrite". Can. J. Chem. 76 (1998), 10-17.
Koprinarov, I. N., et al., "Quantitative Mapping of Structured Polymeric Systems Using Singular Value Decomposition Analysis of Soft X-ray Images", J. Phys. Chem. B (2002) 106, 5358-5364.
Lloyd, D. R., et al., "Microporous Membrane Formation Via Thermally Induced Phase Separation.I.Solid-Liquid Phase Separation", J. Membr. Sci., 52 (1990) 239-261.
Mika, A.M., et al., "Porous Polyelectrolyte Filled Membranes: Effect of Cross-Linking on Flux and Separation", J. Membrane Science, 135, (1997) 81-92.
Mika, A.M., et al., "Poly(4-vinylpyridine)-filled microfiltration membranes: Physicochemical Properties and Morphology", J. Membrane Science, 136, (1997) 221-232.
Stachera, D.M., et al., "Acid Recovery Using Diffusion Dialysis with Poly(4-vinylpyridine)-filled Microporous Membranes", J. Memb. Sci. 148 (1998) 119-127.
Mika, A.M., et al., "Chemical Valves Based on Poly(4-vinylpyridine)-filled Microfiltration Membranes", J. Memb. Sci. 153, (1999) 45-56.
Mika, A.M., et al., "Acid/Base Properties of Poly(4-vinylpyridine) Anchored within Microporous Membranes", J. Memb. Sci.. 152 (1999) 129-140.
Mika, A.M., et al., Ultra-low Pressure Water Softening: A New Approach to Membrane Construction, Desalination, 121 (1999) 149-158.

(Continued)

*Primary Examiner*—Elizabeth M. Cole
*Assistant Examiner*—Anish P Desai
(74) *Attorney, Agent, or Firm*—Christie, Parker & Hale, LLP

(57) ABSTRACT

The invention provides asymmetric membranes composed of a microporous substrate whose pores contain a crosslinked gel, the density of the crosslinked gel being greater at or adjacent to one major surface of the membrane than the density at the other major surface. The membranes are useful for separating matter from liquids and display good flux and good rejection at low pressure.

33 Claims, 8 Drawing Sheets

OTHER PUBLICATIONS

Childs, R.F., et al., Nanofiltration Using Pore-Filled Membranes: Effect of Polyelectrolyte Composition on Performance, Separ. Purif. Technol., 22-23 (2001) 507-517.

Mika, A.M., et al., "Calculation of the Hydrodynamic Permeability of Gels and Gel-Filled Microporous Membranes", Ind. Eng. Chem. Res., 40 (2001) 1694-1705.

Mulder, M., "Basic Principles of Membrane Technology" second Edition, Kluwer Academic Publishers, Dordrecht, the Netherlands, chapter III, (1991), pp. 54-109.

Loeb, S., et al., "Sea water Demineralization by Means of an Osmotic Membrane", Advances in Chemistry Series, 38 (1963), 117-132.

Lonsdale, H.K., et al., "Transport Properties of Cellulose Acetate Osmotic Membranes", J. App. Polym. Sci., 9, (1965), 1341-1362.

Lonsdale, H.K., "The growth of Membrane Technology", J. Membr. Sci., 10, (1982), 81-181.

Van De Witte, P., et al., "Phase separation processes in polymer solutions in relation to membrane formation", J. Membr. Sci. 117, (1996), 1-31.

Zeman, L., et al., "Formation of air-cast cellulose acetate membranes. Part I. Study of macrovoid formation", J. Membr. Sci., 84, (1993), 93-106.

Zeman, L., et al., "Formation of air-cast cellulose acetate membranes Part II. Kinetics of demixing and microvoid growth", J. Membr. Sci., 87, (1994), 267-279.

Cadotte, J.E., et al., "Thin-Film Composite Reverse-Osmosis Membranes: Origin, Development and Recent Advances"; In *Synthetic Membranes*, vol. I, *Desalination*; Turbak, A. F., ed. American Chemical Society: Washington, 1981; p. 306-326.

Cadotte; J. E., "Evolution of Composite Reverse Osmosis Membranes"; Materials Science of Synthetic Membranes; Lloyd, D. R., ed. American Chemical Society: Washington, 1985; p. 273-294.

Hirose, M., et al., "Effect of skin layer surface structures on the flux behaviour of RO membranes", J. Membr. Sci., 121, (1996), 209-215.

Hirose, M., et al., "The relationship between polymer molecular structure of RO membrane skin layers and their RO performances", J. Membrane Sci., 123, (1997), 151-156.

Kwak, S.-Y., et al., "Details of Surface Features in Aromatic Polyamide Reverse Osmosis Membranes Characterized by Scanning Electron and Atomic Force Microscopy", J. Polym. Sci. B., Polym. Phys. 37, (1999), 1429-1440.

Kwak, S.-Y., "Relationship of relaxation property to reverse osmosis permeability in aromatic polyamide thin-film-composite membranes", Polymer, 40, (1999), 6361-6368.

Peterson, R. J., et al., "Thin Film Composite Reverse Osmosis Membranes"; In *Handbook of Industrial Membrane Technology*, Porter, M. E., ed. Noyes Publications: Park Ridge, (1990), p. 307-348.

Dytnerskii, Y. I., et al, "Study of the Porous Structure and Selective Properties of Membranes Obtained by Plasma Polymerization in a Glow Discharge", Colloid Journal of the USSR, (1982), 1024-1028.

Uragami, T., et al., "Studies on Syntheses and Permeabilities of Special Polymer Membranes", Angew. Makromol. Chem., 95 (1981) 45-54.

Yokoyama, Y., et al., "Enzyme Immobilization in an Asymmetric Charged Membrane", J. Membr. Sci., 38 (1988), 223-236.

Yokoyama, Y., et al., "Preparation of a Single Bipolar Membrane by Plasma-Induced Graft Polymerization", J. Membr. Sci., 43, (1989), 165-175.

Childs, R. F., et al., "Formation of Pore-filled Microfiltration Membranes Using a Combination of Modified Interfacial Polymerization and Grafting", J. Polym. Sci, A. Polym Chem 40, (2002) 242-250.

Mika, A. M., et al., "Salt separation and hydrodynamic permeability of a porous membrane filled with pH sensitive gel", J. Membrane Science, 206, (2002) 19-30.

Mika, Alicja M., et al., "Ultra-low pressure water softening with pore-filled membranes" Desalination, 140 (2001), 265-275.

Mika, A. M., "Calculation of the Hydrodynamic Permeability of Gels and Gel-Filled Microporous Membranes", Ind. Eng. Chem. Res. 40 (2001) 1694-1705.

Stachera, D. M., et al., "Tuning the acid recovery performance of poly(4-vinylpyridine)-filled membranes by the introduction of hydrophobic groups", J. Membrane Science, 187, (2001), 213-225.

Yeom, C. K., et al., "A Study on Permeation Behavior of a Liquid Mixture Through PVA Membranes Having a Crosslinking Gradient Structure in Pervaporation", J. App. Polym. Sci. (1996), 59, 1271-1279.

Li, R.H.., et al., "Characterization and mechanical support of asymmetric hydrogel membranes based on the interfacial crosslinking of poly(vinyl alcohol) with toluene diisocyanate", J. Membr. Sci., 111 (1996) 115-122.

McCrory, C.T.C., "Impact of Gel Morphology on Pore-Filled Membranes" PhD Thesis, McMaster University (2001).

Yamaguchi, T., "Plasma-Graft Filling Polymerization: Preparation of a New Type of Pervaporation Membrane for Organic Liquid Mixtures", Macromolecules 24, (1991), 5522-5527.

Yamaguchi, T., et al., "Design of Pervaporation Membrane for Organic-Liquid Separation Based on Solubility Control by Plasma-Graft Filling Polymerization Technique", Ind. Eng. Chem. Res. 32, (1993), 848-853.

Suzuki, F., et al, "Grafting of siloxane on poly(styrene-co-maleic acid) and application of this grafting technique to a porous membrane for gas separation", Journal of membrane Science 104 (1995) 283-290.

Cadotte et al; Thin-Film Composite Reverse-Osmosis Membranes: Origin, Development, and Recent Advances; In Synthetic Membranes, vol. I, Desalination; Turbak, A.F., ed. American Chemical Society: Washington, 1981, p. 305-326.

International Search Report of PCT/CA02/01102, dated Mar. 18, 2003.

International Preliminary Examination Report of PCT/CA02/01102, dated Apr. 7, 2003.

Macromolecules 24, 5522-5527, (1991) (On Order).

Ind. Eng. Chem. Res. 32, 848-853 (1993) (On Order).

* cited by examiner

Membrane with gel-filled side facing feed     Membrane with un-filled side facing feed

ASYMMETRIC GEL-FILLED MICROPOROUS MEMBRANES

CROSS-REFERENCE TO RELATED APPLICATION

This application is a National Phase Patent Application of International Application Number PCT/CA02/01102, filed on Jul. 18, 2002, which claims the benefit of U.S. Provisional Patent Application No. 60/306,412, filed on Jul. 20, 2001.

FIELD OF INVENTION

The present invention relates to certain novel membranes, their manufacture and use.

BACKGROUND OF THE INVENTION

Membranes are used, for instance, in separation processes as selective barriers that allow certain chemical species to pass, i.e., the permeate, while retaining other chemical species, i.e., the retentate. Membranes are used in many applications, for example as biosensors, heparinized surfaces, facilitated transport membranes utilizing crown ethers and other carriers, targeted drug delivery systems including membrane-bound antigens, catalyst-containing membranes, treated surfaces, sharpened resolution chromatographic packing materials, narrow band optical absorbers, and in various water treatments which involve removal of a solute or contaminant, for example, dialysis, electrodialysis, microfiltration, ultrafiltration, reverse osmosis, nanofiltration and in electrolysis and in fuel cells and batteries.

There are many materials or substrates for membranes. Specific physical and chemical characteristics to be considered when selecting a substrate include: porosity, surface area, permeability, solvent resistance, chemical stability, hydrophilicity, flexibility and mechanical integrity. Other characteristics may be important in certain applications.

The rate of transport through a membrane is inversely related to the thickness of the membrane. However, reduction in thickness is normally accompanied by a loss of mechanical strength. Loeb and Sourirajan prepared a membrane which contained a thin dense layer at one surface and a less dense, more open structure through the rest of the membrane. The thin, dense layer provides the separating function of the membrane while the more porous component assists in providing mechanical strength. Loeb and Sourirajan formed the skinned membranes using a casting, partial evaporation and subsequent phase inversion. These and comparable membranes typically are made from a single polymer using some kind of phase separation process in the production of the film.

A further important type of membrane involves the formation of a thin layer on the surface of a supporting membrane in which the thin film has a different composition to that of the support. Such membranes are generally known as thin film composite membranes. Typically, the thin dense layers consist of a crosslinked polyamide that is made using an interfacial polymerization step.

Essentially all commercially available membranes used in reverse osmosis and nanofiltration applications are of a thin film construct with most being based on the thin-film composite approach.

The present invention is concerned with pore-filled membranes, not thin film membranes. It should be stressed that there is a fundamental difference in membrane construction between thin film and pore-filled membranes. The separating or active layer in thin film membranes is typically a dense layer that is formed on the top of a support membrane. This dense layer faces the feed solution. In pore-filled membranes a low density, cross-linked gel is contained within the pores of a microporous substrate and serves as the separating "layer". Because of the nature of the gel it has to be prevented from excessive swelling in contact with water or other gel-swelling solvents by the physical constraint imposed upon it by the microporous host. As a result, in pore-filed membranes attempts are made to avoid having gel surface layers but instead to ensure that the gel is held within the pores of the host.

In Mika et al., J. Membr. Sci., 108 (1995) pp 37 to 56, there is described a procedure for modifying microporous polypropylene and polyethylene membranes wherein 4-vinylpyridine is in-situ graft-polymerized into the pores of the membrane. The teaching of this article is incorporated by reference.

U.S. Pat. No. 6,258,276, the disclosure of which is incorporated by reference, teaches that by cross-linking the membranes described by Mika et al. with a suitable cross-linking agent, such as divinylbenzene (DVB), there are provided charged membranes comprising porous microfiltration substrate membranes whose pores have anchored therein a cross-linked polyelectrolyte or hydrogel which exhibit novel effects in a variety of membrane applications. In particular, the membranes are said to exhibit significant ion rejection properties, enabling water softening to be effected, particularly at ultra-low pressure, such as the pressure of tap water, by removing multivalent ions, such as calcium and magnesium, in preference to monovalent ions, such as sodium. The membranes further exhibit electrochemical separator properties which make them suitable for a wide variety of applications, including electrodialysis, battery separators, fuel cell separators and electrochemical synthesis. In addition, the membrane may be used for Donnan dialysis, diffusion dialysis and pervaporation.

Table 1 shows performance data of some symmetric pore-filled membranes at a driving pressure of 100 kPa with a municipal tap water feed, and one commercially available thin-film or non-pore filled membrane (DESAL-51). In each case the pore-filled membranes were made using a poly (propylene) microporous host membrane.

TABLE 1

| INCORPORATED GEL | Mass-gain (%) | Cross-linking (%) | FLUX at 100 kPa kg/m²h | REJECTION (%) | | |
|---|---|---|---|---|---|---|
| | | | | Na | Mg | Ca |
| Poly(vinylbenzyl ammonium)/Piperazine | 42 | 5 | 12 | 35 | 79 | 80 |
| Poly(vinylbenzyl ammonium)/DABCO | 53 | 9 | 7 | 24 | 78 | 62 |
| Poly(vinylpyridine)/α, α'-dichloro-p-xylene | 66 | 11 | 8 | 20 | 74 | 61 |
| DESAL-51 | | | 8 | 21 | 71 | 54 |

DESAL-51 is a commercially available high performance, flat-sheet nanofiltration membrane produced by Osmonics. The data shown for DESAL-51 in Table 1 were obtained under identical conditions to the pore-filled membranes.

In these pore-filled membranes transport of matter such as solvent or solutes occurs only through the incorporated gel phase and not through the microporous support material. The microporous support simply provides mechanical support for the incorporated gel.

These polyelectrolyte gel-filled membranes have a more or less even distribution of the incorporated polyelectrolyte gel-throughout the thickness of the membrane. This means that the thickness of the active layer, i.e., the thickness of the polyelectrolyte gel layer, is approximately the same as the thickness of the starting host membrane, typically in the range 80 to 120 μm.

Plasma induced graft polymerization techniques, which are well known as a surface modification method, could, in principle, be used to prepare asymmetrically filled porous membranes. Yamaguchi et al. [J. Polym. Sci. Part A. Polymer Chem. 34, 1203-1208 (1996), Macromolecules 24, 5522-5527, (1991) and Ind. Eng. Chem. Res. 32, 848-853 (1993).] have described the plasma graft polymerization of poly(methylacrylate) onto a microporous high density poly (ethylene) membrane, pore size 0.02 μm. It was found that the grafted polymer was distributed symmetrically through the membrane cross-section. The graft polymerization rate was, however, affected by changing the monomer diffusivity relative to the reactivity of activated sites with change of the solvent. This in principle could lead to control of the grafted polymer location in the substrate. The present inventors have found that it is very hard to control the location of the grafted polymer using plasma activation techniques. In particular, with the large pore-sized and high porosity substrates preferred for high performance pore filled nanofiltration membranes experience in introducing poly(acrylic acid) has been that grafting largely occurs throughout the thickness of the membrane. The grafted polymers introduced by this method were not crosslinked.

Porous hollow fibre membranes filled with hydrogels having mesh size asymmetry are disclosed by Dai and Barbari [J. Membrane Science, 171, 79-86, (2000)]. The hollow fibre was first impregnated with a solution of poly (vinyl(alcohol) and gluteraldehyde as a cross-linker so as to form an incorporated gel evenly distributed across the thickness of the membrane. After the cross-linking reaction was completed in the pores, the pore-filling hydrogel was modified to create mesh size asymmetry in the gel phase within the wall of the fibre. A gradient cross-linking was used to create the asymmetry in cross-linking. While there was an asymmetry in cross-linking density through the wall of the fibres the overall gel density did not significantly alter.

SUMMARY OF THE INVENTION

The membranes of U.S. Pat. No. 6,258,276 have the crosslinked polyelectrolyte or hydrogel evenly distributed across the thickness of the membranes, i.e., the membranes are symmetrical. It has now been found that if the polyelectrolyte gel or hydrogel is distributed unevenly, with a greater concentration of the gel at or near one surface of the membrane than the other, then the membrane displays superior properties, particularly higher flux, as compared with, for example membranes of U.S. Pat. No. 6,258,276 and other commercially available membranes, and can be operated at ultra low pressure. Such membranes having uneven distribution of gel in the membrane cross-section are referred to herein as asymmetric membranes.

Accordingly, in one aspect the present invention provides a membrane comprising a microporous substrate and a crosslinked gel, preferably a hydrogel or a polyelectrolyte gel, located in pores of the substrate, wherein the crosslinked gel is distributed unevenly across the thickness of the membrane so that there is a gradient of gel distribution from one major surface of the membrane towards the other major surface of the membrane. Preferably, the density of the crosslinked gel is substantially greater at or adjacent to one major surface or the membrane than the density at or adjacent to the other major surface of the membrane.

It will be appreciated that the membranes of the invention have a continuous or substantially continuous band or layer of the gel in two dimensions of the microporous substrate that are parallel to a major surface of the membrane. The gradient in gel density is in the third, or thickness, dimension of the membrane.

In another aspect the invention provides a process for preparing a membrane of the invention as described above, which process comprises forming a crosslinked gel, preferably a hydrogel or a polyelectrolyte gel, in pores of a microporous substrate, the formation being carried out in such a manner that the crosslinked gel is distributed unevenly across the thickness of the substrate so that there is a gradient of gel distribution from one major surface of the membrane towards the other major surface of the membrane.

In yet another aspect the invention provides a process for preparing an asymmetric membrane wherein the pores of the microporous substrate are filled with a solution of a polymer, or a polymerizable monomer, whereafter some of the solvent is allowed to evaporate and crosslinking or polymerization and crosslinking is allowed to proceed in the pores to form the asymmetric membrane.

In yet another aspect of the invention, the polymer or polymerizable monomer, or cross-linking agent bear functional groups that are ionically charged or groups that can be rendered ionically charged.

In yet another aspect the invention provides a process for preparing an asymmetric membrane which comprises filling the pores of the microporous substrate with a solution of a polymerizable monomer, a crosslinking agent, a photoinitiator for polymerization and a photoblocker, and irradiating to cause polymerization to form the asymmetric membrane.

In yet another aspect the invention provides a process for removal of matter from a liquid, usually water, which comprises passing the liquid through a membrane of the invention.

A variety of different types of asymmetry are possible including variation in the density of the gel. Further, asymmetry in the host microporous substrate can also be used to assist in providing asymmetry in the gel loading.

Membranes of the invention display high fluxes at pressures normally used in water softening applications using commercial membranes. In many instances they can be operated at lower pressures and still retain separation, so the productivity of commercial membranes can be achieved at lower operating pressures. This means that separations can be achieved with lower energy, lower capital costs and also lower fouling tendencies.

DESCRIPTION OF PREFERRED EMBODIMENTS

The crosslinked gel is preferably a hydrogel and more preferably is a polyelectrolyte hydrogel. The crosslinked gel is preferably comprised of crosslinked polymers or copolymers. The microporous substrate may comprise a porous substrate formed of polymeric material, such as polypropylene, polyethylene, poly(vinylidene difluoride), poly(tetrafluoroethylene), poly(esters), nylons, polysulfones, poly (carbonates), cellulose or cellulose acetate, or ceramics or porous glasses into the pores of which may be introduced crosslinked polyelectrolytes or hydrogels anchored within the substrate pores. The incorporated crosslinked polyelectrolyte or hydrogel need not be chemically attached or grafted to the microporous support.

For microporous substrates, the average pore diameters may vary widely but preferably range from about 0.1 to about 10 microns, more preferably from about 0.2 to about 5 microns and particularly from about 0.2 to about 2.0 microns. Pore diameters for microporous substrate are measured by the bubble-point method according to ASTM F-316.

The porosity or pore volume of a polymeric porous substrate used herein is preferably from about 25 to about 95%, more preferably from about 45 to about 85% and particularly from about 60 to about 85%. Porosity can be derived from the value of the bulk density of the porous substrate and the polymer density of substrate polymer according to ASTM D-792.

The thickness of substrate will depend on the intended use of the membrane product. For many uses, for example microfiltration, thicknesses ranging from about 1 to about 500 microns, more preferably about 10 to about 240 microns and particularly about 20 to about 150 microns, would be suitable.

In-situ polymerization of a suitable monomer together with a suitable cross-linking monomer to enable anchoring of polymeric molecules that make up the crosslinked polyelectrolyte or hydrogel may be effected by any convenient polymerization procedure, preferably by free-radical polymerization operation. Such free radical polymerization may include initiation of the polymerization by radiation initiation, thermal initiation or redox initiation. Typical initiators include benzoin ethers and benzoyl peroxide. The in-situ polymerization may include graft polymerization.

Monomers which are suitable for such in-situ polymerization include unsaturated derivatives such as vinyl and acryl monomers and derivatives of these momoners containing a functional group that provides, or can be modified by a post-polymerization treatment to provide, an ion-exchange site to permit formation of a polyelectrolyte or hydrogel. Mixtures of comonomers can also be used. Suitable examples include 4-vinylpyridine, 2-vinylpyridine, acrylic acid, methacrylic acid, N-vinylimidazolinum salts, diallyldimethylammonium salts, N,N-dimethyl-2-aminoethyl methacrylate, allylamine N-(dimethylaminoethyl)-acrylamide, N,N-dimethylaminopropyl-methacrylamide), sodium styrene sulfonate and vinylbenzylhalides such as vinylbenzyl chloride or bromide. There may also be present an unsaturated polymerizable comonomer that does not contain a functional group, for example, styrene. It is possible to introduce the functional group by a post-polymerization treatment. For example, styrene can be polymerized and then sulfonated. The polyelectrolyte polymers so formed do not become grafted to the polymer of the pores. Nonetheless, the polyelectrolyte polymer in the pores is non-extractable and is permanently anchored by being entrapped in the pores.

Crosslinked hydrogels can be formed using, for example, crosslinked polyvinyl alcohol, polyacrylamide, polyethylene glycols and polypropylene glycols poly(vinylpyrrolidone), cellulose derivatives including cellulose acetate and natural polymers including agar-agar and the like.

The cross-linking of the in-situ polymerized molecule to anchor the gel polymer within the pores by entanglement with the microporous host may be effected by adding the cross-linking monomer to the in-situ polymerized monomer, so that the in-situ polymerization and cross-linking occur simultaneously. Alternatively, the cross-linking may be effected as a separate operation following the initial in-situ polymerization. The cross-linking which is formed may be covalent or ionic in nature and may be effected by radiation cross-linking.

The simultaneous in-situ polymerization and cross-linking is attractive since it yields gels in a single step.

The cross-linking agent may be any suitable unsaturated molecule capable of reacting to produce cross-links in the in-situ polymerized molecules. The cross-linking agent may be a molecule containing at least two unsaturated moieties to permit the formation of cross-links. Examples of such monomers are divinylbenzene and divinylpyridine. Other examples of suitable cross-linking monomers are bisacrylamidoacetic acid, 1,3-butanediol diacrylate, 1,4-butanediol diacrylate 1,3-butanediol dimethacrylate, 1,4-butanediol dimethacrylate, 1,4-butanediol divinyl ether, N-(iso-butoxymethyl)methacrylamide, 1,4-cyclohexanediol dimethacrylate, 1,4-diacryloylpiperazine, diallyl diglycol carbonate, diallyl phthalate, diethylene glycol diacrylate, diethylene glycol dimethacrylate, diethylene glycol divinyl ether, 2,2-dimethylpropanediol dimethacrylate, dipropylene glycol dimethacrylate, divinyl glycol, divinyl sebacate, ethylene glycol diacrylate, ethylene glycol diglycidyl ether, ethylene glycol dimethacrylate, glutaraldehyde, glycerol trimethacrylate, 1,6-hexanediol diacrylate, N,N-methylenebisacrylamide, 1,3-phenylene diacrylate, 1,4-phenylene diacrylate, poly(ethylene glycol) diacrylate, poly(ethylene glycol dimethacylate) poly(propylene glycol) diamethacrylate.

The quantity of crosslinking monomer used depends on the membrane application and may vary up to about 20 mole % of the total weight of in-situ polymerized monomer mixture. For water treatment under low pressure driven applications, the quantity of crosslinking monomer may range up to about 20 mole %, preferably from about 2.5 to about 15 mole %, more preferably from about 5 to about 10 mole % of total in-situ polymerized monomer mixture.

The crosslinked polyelectrolyte or hydrogels may be anchored within the pores of the host membrane by crosslinking a preformed soluble polymer or copolymer within the pores of the host as described in A. K. Pandey, R. F. Childs, M. West, J. N. A. Lott, B. E. McCarry and J. M. Dickson: Formation of Pore-Filled Ion-Exchange Membranes using in-situ Cross-linking: Poly(vinylbenzylammonium salt) Filled Membranes. J. Polym. Sci. Part A Polymer Chemistry, 39, (2001) 807-820. The disclosure of this article is incorporated by reference. The crosslinking agent used in this process may be a molecule containing at least two or more functional groups capable of reacting with functional groups or other active sites on the dissolved polymer or copolymer to form covalent bonds. Examples of molecules forming covalent bonds are dialkylating agents such as 1,3-dibromopropane, 1,4-dibromomethylxylene, di-acylating and triacrylating agents, such as isophthaloyl and trimesoyl chloride, disulfonating and trisulfonating agents such as naphthalene di and trisulfonyl chloride, respectively, that are effective with polymers such as poly(amines) and di and higher amines such as 1,6-diaminohexane 1,4-diazabicyclo[2.2.2]octane, diethylene triamine, and the like that can be used with polymers containing displaceable groups such as halides, epoxy groups, and groups based on acyl or sulfonyl derivatives.

The amine type nitrogen atoms of incorporated polymers may be quaternized such as by alkylation, for certain applications. Examples of suitable quaternizing agents include, dimethyl sulphate, as well as alkyl halides, including arylalkyl halides, for example benzyl chloride or benzyl bromide.

Particular combinations of monomers, comonomers, polymers or copolymers for production of the cross-linked polyelectrolyte gels or hydrogels which may be employed include:

a preformed polymer of vinylbenzylchloride (poly(vinylbenzylchloride)) and a di- or higher polyamine followed optionally by treatment with a tertiary amine in order to introduce further ion-exchange groups, an in-situ formed copolymer of vinylpyridine and a monomer selected from divinyl benzene and divinylpyridine, a preformed polyvinylpyridine which is subsequently cross-linked with an dialkylating agent, such as 1,3-dibromo-propane, an in-situ copolymer of vinylbenzylchloride and divinylbenzene into which the ion-exchange functional groups are introduced by reaction with a tertiary amine, for example trimethylamine or triethylamine, an in-situ formed copolymer of styrene and divinylbenzene into which the ion-exchange functional groups are introduced by sulfonation, an in-situ formed copolymer of acrylic acid or methacrylic acid and divinylbenzene, an in-situ formed copolymer of acrylic acid or methacrylic acid and a diacrylate, a solution of poly(ethyleneimine) which is crosslinked by an dialkylation agent, a di- or higher epoxy compound, or a di- or higher acylating or sulfonating compound.

Some examples of neutral gels, along with suitable compounds for use in their crosslinking, include: Poly(vinyl alcohol) cross-linked with agents such as gluteraldehyde; Poly(sacharides) cross-linked with agents such as ethyleneglycol diglycidyl ether; poly(N-vinylpyrrolidone), poly(acrylamide) including those prepared from N-derivatized acrylamides such as N-isopropylacrylamide, poly(2-hydroxyethylmethacrylate), all of which can be cross-linked with any suitable divinyl compound; poly(ethyleneglycol) and poly(propylene glycol) which can be cross-linked by reaction of the terminal hydroxyl functions with a di- or higher functionality reagent such as a di- or higher acid chlorides or isocyanates, or by derivatising the ends such that these can be further polymerized to provide cross-links for example using unsaturated esters such as acrylate, methacrylate, or with such groups that will react used to react with a cross-linking agent. In the latter case suitable end derivatives include epoxy groups such as glycidyl ethers which can be reacted with di- or higher amines.

There are various ways to achieve the asymmetry of the membranes of the present invention, include the following:

1. filling the pores of a host microporous membrane with a solution of a polymer and suitable cross-linking agent, the solution being sufficiently diluted that no gelling occurs in the absence of evaporation, and allowing the solvent to partially evaporate. Evaporation of solvent results in a reduced volume of the polymer solution and a resulting increased concentration of polymer and crosslinking agent so that gelling occurs, or 2. as in 1 but in which two or more solvents are used to dissolve the polymer wherein one of the two solvents is selected such that it is volatile and readily removed by evaporation, or 3. as in 2 but in which the more volatile solvent is selected to retard the cross-linking step during the filling stage but which on removal by evaporation facilitates the gelling reaction, and 4. using any of the three above techniques with an asymmetric host membrane in which there is a gradient in pore sizes through the thickness of the membrane and in which capillary forces on evaporation lead to the remaining liquid being held in the smaller pore-size domains.

The gelling reaction of poly(4-vinylpyridine) (P4VP) with α,α'-dibromoxylene (DBX) is shown below to be effective in producing cross-linked poly(4-vinylpyridine) filled membranes. The cross-linking reaction itself may produce sufficient charge to effect water-softening. The charge can be increased, however, by converting uncharged nitrogen atoms of the remaining pyridine atoms into their ionic form. This can be done, for example, by reaction with benzyl bromide or benzyl chloride. The reaction is illustrated below:

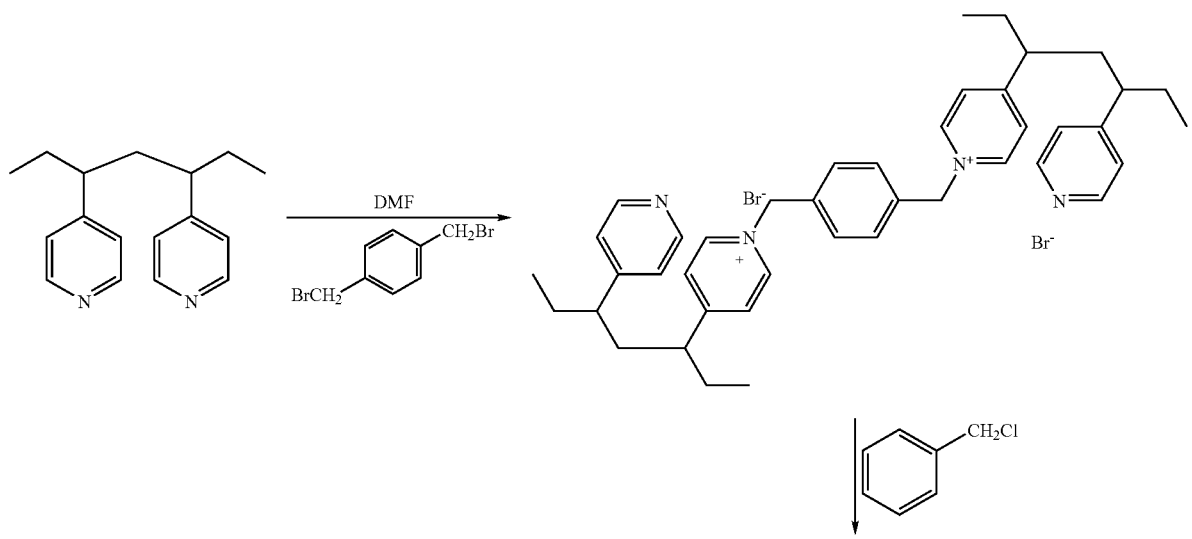

-continued

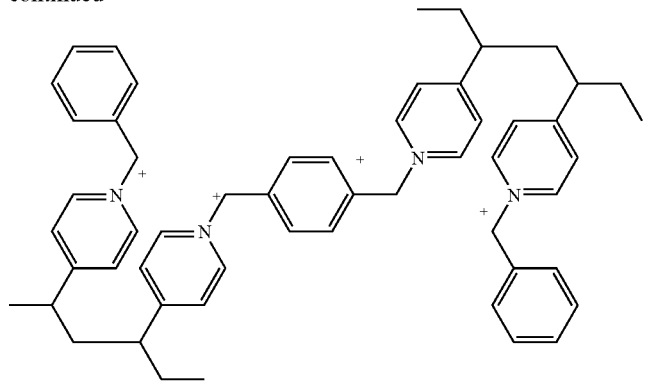

The gelling reaction involves a nucleophilic bimolecular substitution. Such reactions proceed well in polar aprotic solvents but protic solvents retard the reaction. The solvent used in the present case must also dissolve the poly(4-vinylpyridine) and the crosslinking agent. Examples include N,N-dimethylformamide (DMF), N-methyl pyrrolidone, dimethyl sulfoxide and the like. N,N-dimethylformamide (boiling point 153° C.) is an excellent solvent for poly(4-vinylpyridine) and also a good solvent for the nucleophilic displacement reaction. Methanol (boiling point 65° C.) is volatile and is readily removed by evaporation and is also a good solvent for poly(4-vinylpyridine); however, it is expected to be a poor solvent for such substitution reactions and retard their rate of reaction. Other solvents that can be used in place of methanol include water, ethanol and the like.

Where the polymer is polyethyleneimine there can be used a mixture of a high and a low boiling alcohol, for example isopropanol and methanol, particularly for the case where a diepoxide is used to crosslink.

Another way to produce an asymmetric membrane is to subject a suitable monomer and crosslinking agent contained in the pores of a microporous membrane to photopolymerization, ensuring that the light does not penetrate to the full depth of the membrane so that polymerization and crosslinking do not occur throughout the full depth of the membrane. Irradiating a poly(propylene) microporous membrane containing 4-vinylpyridine (P4VP), divinylbenzene (DVB) and 2,2-dimethoxy-2-phenylacetophenone (DMPA) as photosensitizer with 350 nm wavelength light gives a membrane that is symmetrically filled with crosslinked (P4VP). In accordance with the present invention a light absorbing material is added to the system to regulate the depth of penetration of the light. The choice of light absorber, or photoblocker is made on the basis of the wavelength to be blocked, the extinction coefficient of the light absorber at this wavelength and the absence of any adverse photoreactions or involvement in the polymerization reaction. A suitable photoblocker for use at 350 nm is 2,2'-dihydroxy-4,4'-dimethoxybenzophenone (DDB).

DDB undergoes an efficient intra-molecular isomerisation on the absorption of light. This reaction is reversed thermally meaning that the starting DDB is not depleted on irradiation but converts the photochemical energy into heat. DDB's sole function is to compete for the incident photons that would otherwise be captured by the DMPA. The DDB or other photoblocker is removed from the finished membrane.

The photoblocker (DDB) has a uv spectrum with peaks at $\lambda_{max}$ 251 ($\epsilon$=13,800), $\lambda_{max}$ 350 ($\epsilon$=321). Assuming that the Beer Lambert law holds at high concentrations of DDB the concentration of DDB required to absorb 99% of the incident light at different depths in the membrane was calculated. These concentrations were used in the experiments described below.

In a variant of this embodiment that uses light, it is possible to use light of a wavelength such that it does not penetrate the full thickness of the membrane, and achieve asymmetry in this manner.

An important characteristic of a membrane is the flux at which it will operate. The flux can be expressed as the number of kg of liquid that will pass through one square metre of the membrane in one hour at a particular pressure. It is desirable that the flux at any particular pressure shall be as high as possible. As shown below, membranes of the invention display high flux; as shown in examples below the flux of one membrane of the invention is about 5 times higher than that of a high quality commercially available nanofiltration membrane. It is noteworthy that membranes of the invention display high flux at low pressures.

Membranes of the invention are particularly useful for separating multivalent cations, for example $Ca^{2+}$ and $Mg^{2+}$, but also for separating monovalent cations, for example $Na^+$. They operate efficiently at pressures below those at which commercial membranes cease to be effective, for example below 300 kPa, and especially below 100 kPa.

Experience has shown that symmetrically filled membranes do not exhibit any major change in flux or separation when inverted. With the asymmetric membranes of the invention a marked difference in separation is seen depending on which surface of the membrane faces the feed. This indicates an asymmetric distribution of the crosslinked polyelectrolyte in the membrane. As demonstrated below, if the surface with the higher concentration of crosslinked polyelectrolyte faces the feed the separation achieved is markedly superior to that achieved when the other surface faces the feed.

The asymmetry of a membrane of the invention can be illustrated by comparing its effectiveness in rejecting matter present in a liquid when the liquid is fed to the membrane with the membrane in two different orientations. In the one orientation the liquid is fed to that major surface of the membrane that has the major amount of the crosslinked polyelectrolyte. In the other orientation the liquid is fed to the other major surface of the membrane. Thus, it is possible to measure rejection rates of the membrane in the two orientations, but otherwise under the same conditions, and to compare these rates to derive a ratio, referred to in this specification as the rejection ratio. After allowing for experimental error, a rejection ratio greater than 1 indicates asymmetry. It is possible to achieve a ratio of 1.5 or greater, preferably 2 or greater and more preferably 2.5 or greater.

The invention is further illustrated in the following examples and in the accompanying drawings, of which:

FIG. 1 shows schematically a pore-filled membrane and a thin-film membrane;

FIG. 2 shows schematically a pore-filled symmetrical membrane in accordance with the teaching of U.S. Pat. No. 6,258,276;

Figure 1:
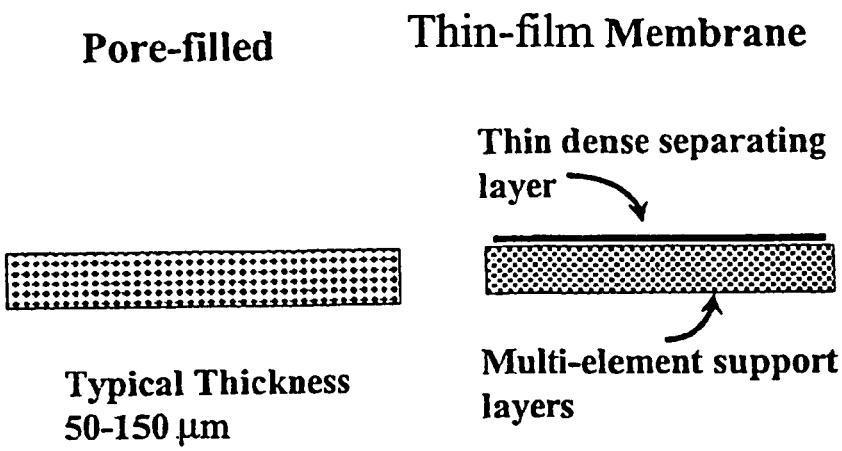
Figure 2:
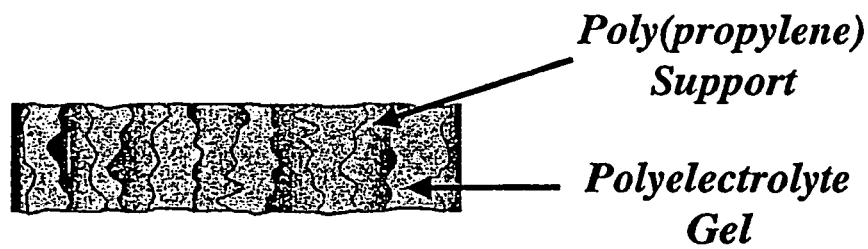
Figure 3:
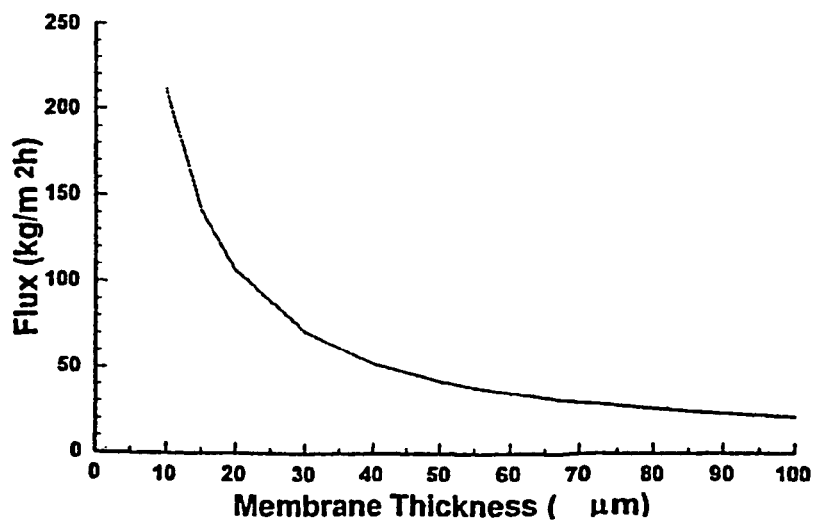
FIG. 3 is a graph showing the calculated flux of a symmetrical membrane as a function of thickness.
Figure 4:
FIG. 4 shows schematically an asymmetrically filled membrane of the present invention and a symmetrically filled membrane of the prior art.

The flux through a membrane is inversely proportional to the thickness of the active layer of the membrane. The dramatic effect of thickness on the pressure driven flux of pore-filled membranes is shown in FIG. 3, where the flux of a membrane, calculated by the inventors, is shown as a function of thickness.

Base Membranes

Poly(propylene) microporous base membranes available from 3M Corporation were used in this work. Two of these membranes (PP-4 and PP-3) are symmetric with the properties shown in Table 2. There was also used an asymmetric poly(propylene) microporous membrane (PP-1A) also available from 3M. The properties of this membrane are also given in Table 2.

TABLE 2

Properties of Microporous Substrate Membranes

| Substrate Code | Substrate 3M Identifier | Pore-size[a] (µm) | Porosity[a] (vol %) | Thickness (µm) | Specific porosity[b] (cm³/g) |
|---|---|---|---|---|---|
| PP-4 | 826-9c | 0.26 | 60 | 56 | 1.65 |
| PP-3 | 689-11 (Apr. 13, 1989) | 0.819 | 80.5 | 79 | 4.54 |
| PP-1A | 558-8 (Dec. 28, 1987) | 0.178 | 68.5 | 44 | 2.39 |

[a]Pore-size and porosity information provided by 3M Company. Pore-size determined by bubble point method.
[b]Specific porosity = $\epsilon_s/(1 - \epsilon_s) \cdot d_{pp}$ where $\epsilon_s$ is the porosity and $d_{pp}$ is the density of poly(propylene)

Figure 6:
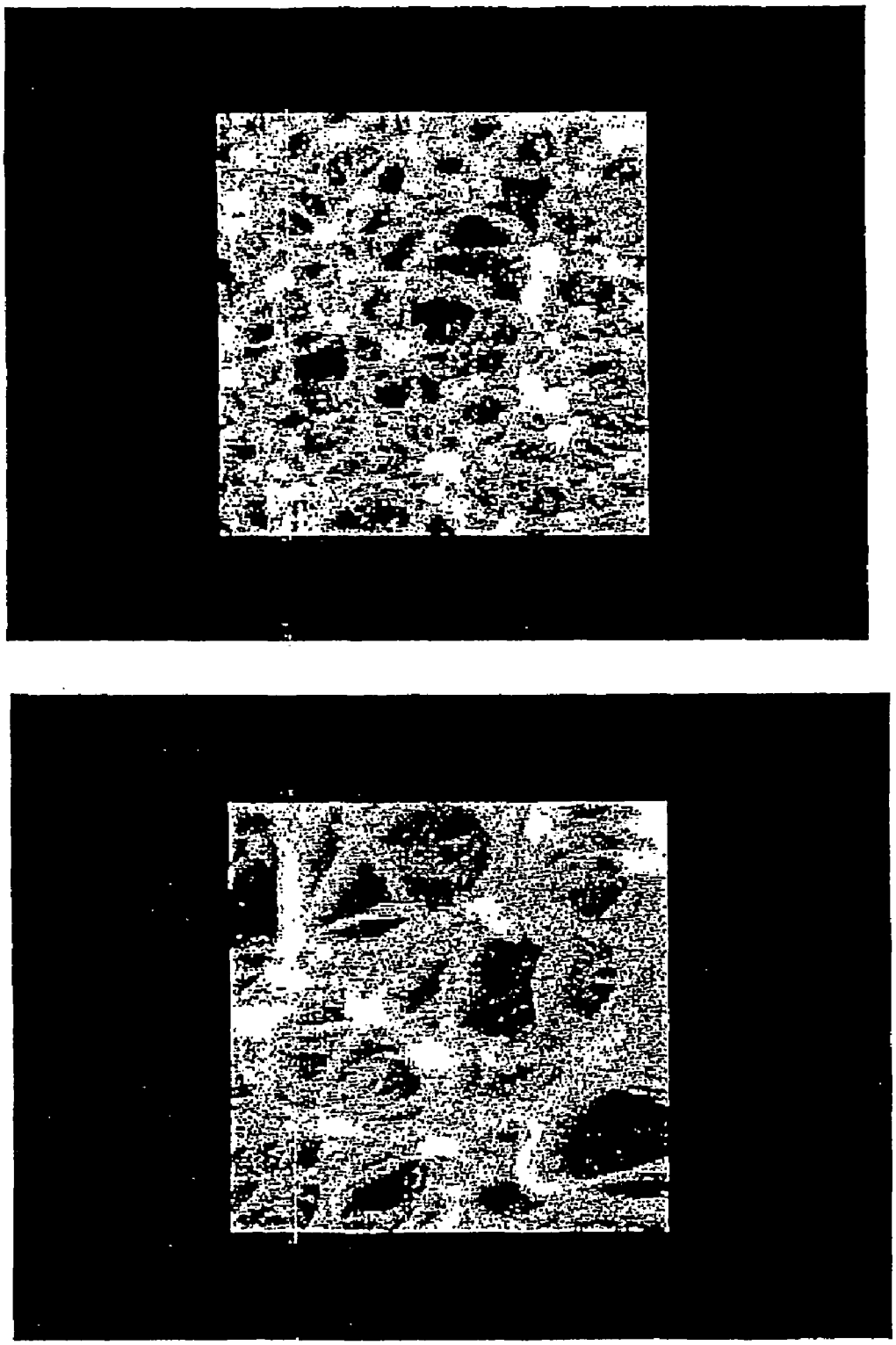
FIG. 6 shows Atomic Force Micrograph (AFM) images of two sides of an asymmetric membrane substrate.

The pore size given for PP-1A in Table 2 is an average figure that does not take into account the asymmetry inherent in its membrane. Atomic Force Micrographs (AFM) images of the two surfaces of the membrane are given in FIG. 6 where it can clearly be seen that one side has a much smaller average pore size than the other. Critical factors affecting flux are membrane thickness and membrane porosity. The flux is inversely proportional to thickness while scaling with increased porosity. Thus the PP-1A membrane would be expected to exhibit a higher performance than the PP-4 on the basis of both of these factors.

Preparation of Asymmetric Membranes Using a Single Solvent

In these experiments solutions of poly(4-vinylpyridine) (P4VP) with the DBX cross-linker (10 mol %) in dimethylformamide (DMF) were used (see Table 3). The concentration of the P4VP and DBX was such that no gel was formed on standing in a test tube. In order to form a gel by the cross-linking route it is important that the concentration of the starting polymer exceed the overlap concentration, which is the concentration of a polymer in solution when its coils of one polymer molecule start to overlap with others in solution. (The overlap concentration depends among other things on the molecular weight of the starting polymer and the properties of the solvent.)

The solution was used to fill the pores of the asymmetric microporous membrane PP-1A. The membrane was then allowed to stand with the larger pore sized surface exposed to an air-flow in a hood for a period of 10 minutes. After this evaporation step the membrane was covered with a poly-ethylene terephthalate (PET) sheet, sandwiched between two glass plates and allowed to stand for 12 hours. The membrane was washed, dried and weighed in order to determine the mass gain.

Figure 5:
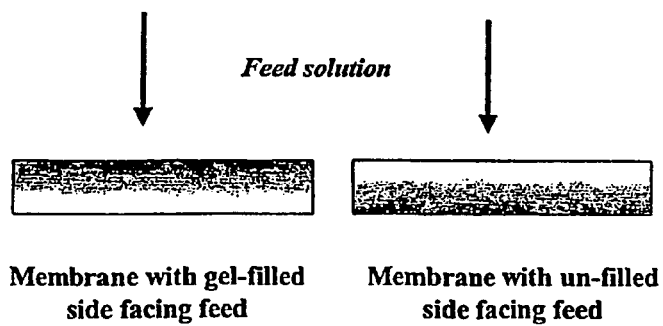
FIG. 5 shows schematically an asymmetrically filled membrane of the invention in two orientations, one with the polyelectrolyte facing towards the liquid feed and the other with the polyelectrolyte facing away from the liquid feed.

The membrane was tested for its behavior under pressure using pure water and a 300 ppm NaCl solution. The results are given in Table 3. The distribution of gel within the pores of the membranes was probed by reversing the membrane in the test cell so as to change the side of the membrane facing the feed (see FIG. 5). Previous experience has shown that symmetrically filled membranes do not exhibit any major change in flux or separation when inverted in the cell. In the case of the membrane prepared by this evaporative process a marked difference in separation was seen depending on the surface facing the feed (see Table 3).

TABLE 3

P4VP containing membranes prepared by evaporation of DMF

| | Preparation Conditions | | | | 300 ppm NaCl | | | |
|---|---|---|---|---|---|---|---|---|
| | | Degree of | | | gel facing feed | | gel oppos. feed | |
| | | Cross- | Mass | Water Flux | | | | |
| | P4VP Conc. | linking | Gain | (100 kPa) | Flux | Rejec. | Flux | Rejec. |
| Membrane | (wt %) | (mol-%) | (%) | (kg/m$^2$h) | (kg/m$^2$h) | (%) | (kg/m$^2$h) | (%) |
| AM531[a] | 1.7 | 10.0 | 10 | 127 | 145 | 14.5 | — | |
| AM532[a] | 2.2 | 10.0 | 10 | 100 | 134 | 16.0 | 137 | 3.9 |
| AM534[b] | 2.0 | 10.0 | N/A | 39 | 39 | 32.6 | 39 | 21.6 |

[a]quaternized only by cross-linking
[b]fully quaternized with benzyl bromide

The results obtained with membrane 534 which was produced by evaporation of the DMF solution show that the salt rejection depends on which side faces the feed solution under the test conditions. This indicates an asymmetric distribution of the gel in the membrane. The highest separation is observed when the small-pore sized face of the membrane faced the feed, indicating that as evaporation occurred from the large pore sized surface during the membrane preparation step, the gel was formed in the small pore-sized domain.

Membrane 531 and 532 have remarkably high fluxes but still show a low salt rejection. These relatively low salt rejections (ca. 15%) may result from severe concentration polarization induced by the very high fluxes obtained with these membranes. It should be noted that the only charge present in the first two membranes comes from that induced by the cross-linking reaction.

Figure 8:
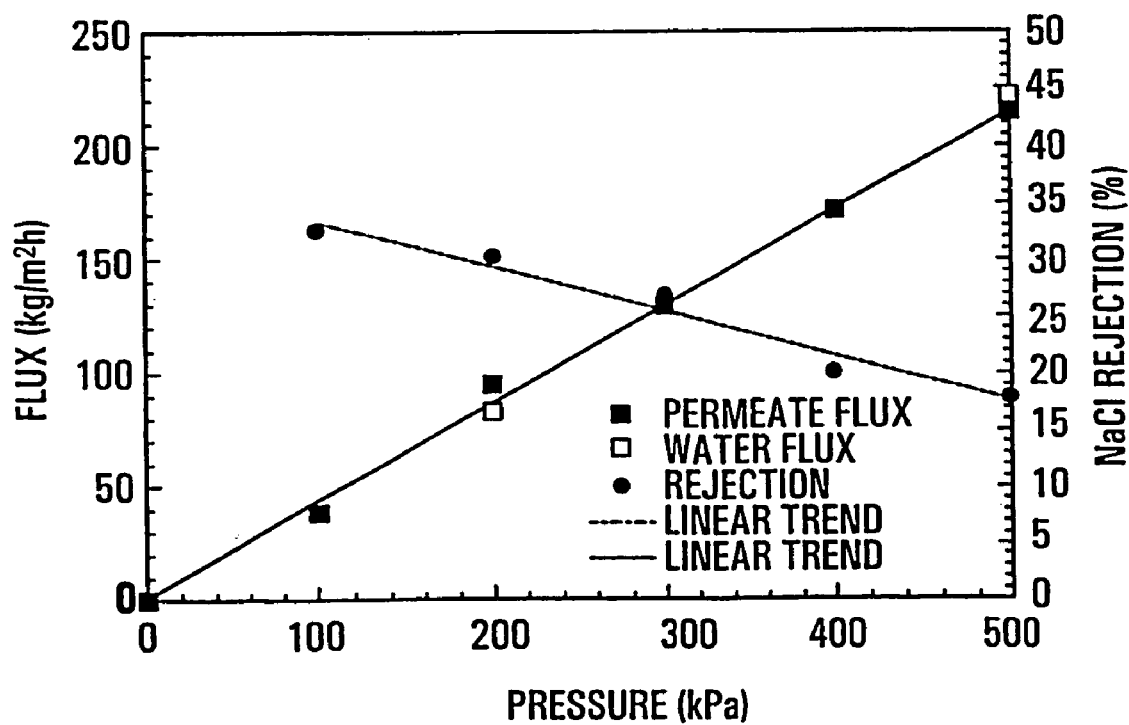
FIG. 8 is a graph showing flux and NaCl rejection as a function of pressure with a membrane of the invention.

The third membrane (AM534) was fully benzylated after the cross-linking step. This membrane has a lower flux but higher rejection of NaCl. As will be shown later in this disclosure, the flux of this membrane is about 5 times higher than a high quality commercially available nanofiltration membrane. The behavior of membrane AM534 with change in pressure is shown in FIG. 8. The pure-water flux and permeate flux with the 300 ppm salt test solution was linear up to 500 kPa. This suggests that the polyelectrolyte gel within the membrane is not changing structure either as a result of the high hydraulic flows or the presence of solute. The rejection of NaCl with this membrane was reduced as the pressure and hydraulic flow increased. This reduction is likely due to concentration polarization. It should be noted that this membrane still exhibits a ca. 20% rejection of NaCl at a flux of more than 200 kg/m$^2$h; a result which as far as the inventors are aware is unprecedented.

It is noted that in the absence of evaporation no gels were formed in the membranes.

Use of a Two Solvent System in which One Solvent Inhibits the Cross-Linking Step The effect of adding methanol to a DMF solution of poly(4-vinylpyridine) is shown in Table 4, entries 1 and 2. In these two test tube experiments the time taken to form a gel by cross-linking poly(4-vinylpyridine) with dibromoxylene was observed visually. Both solutions had identical poly(4-vinylpyridine) and dibromoxylene concentrations. The solution containing 50 wt % methanol took 2.5 times as long to form a gel as the one just using DMF as solvent.

In addition to using the inhibiting effect of a co-solvent such as methanol it is again possible to fill the host membrane with a solution whose concentration of polymer is too low to form a gel. On evaporation of the solvent the concentration will increase and a point will be reached when a gel can be formed. (The increase in concentration will also have the effect of increasing the rate of the gelling reaction.) This effect is clearly shown in Table 4, entries 3 and 4 where the starting poly(4-vinylpyridine) concentration is reduced to some 60% of that shown in entries 1 and 2. It can be seen irrespective of the solvent used no gel is formed with these lower concentration solutions.

TABLE 4

Qualitative observations on the time taken to form poly (4-vinylpyridine) gels

| Experiment | P4VP (wt %) | DBX/VP (mol %) | MeOH/DMF (wt/wt) | Gelation time (min) |
|---|---|---|---|---|
| 1 | 5.1 | 9.7 | 0/1 | 153 |
| 2 | 5.1 | 10.9 | 1/1 | 383 |
| 3 | 3.0 | 11.2 | 1/1 | no gel |
| 4 | 3.0 | 10.0 | 0/1 | no gel |

Reactions carried out in test tubes.
P4VP - poly(4-vinylpyridine),
DBX - α,α' - dibromoxylene,
MeOH methanol,
DMF dimethylformamide.
VP = 4-vinylpyridine.

A series of pore-filled membranes were prepared using a 3 wt % solution of PVP with 10 mol % DBX in a mixture of DMF/MeOH. The base membrane used was the symmetrical substrate PP-4. As shown in Table 4, under these conditions no gel should be formed in the membranes unless some evaporation of the solvent(s) takes place. In each case the membranes were filed with the solution, allowed to stand for 60 seconds after filling for evaporation of the solvent to occur, and then sealed while the gelling reaction was allowed to proceed for 1 hour. The membranes were quaternized with benzyl bromide and subsequently converted into their chloride form for analysis. In each case the mass gain and NaCl separation and flux at 100 kPa were measured. The results of these experiments are shown in Table 5.

TABLE 5

Effect of solvent evaporation on mass gain and performance of poly(N-benzyl-4-vinylpyridinium salt) filled membranes

| Membrane | MeOH/ DMF (wt/wt) | P4VP (wt %) | DBX/VP (mol %) | Exptl. Mass gain % | Calc Mass gain % | Flux (kg/m²h) | Rejec. % |
|---|---|---|---|---|---|---|---|
| 10185 | 0/1 | 3.0 | 10.0 | 0 | 12.8 | 1400 | 0 |
| 10184 | 1/4 | 3.1 | 10.5 | 1.2 | 12.9 | 264 | 0 |
| 10183 | 3/7 | 2.9 | 10.1 | 4.2 | 11.3 | 119 | 3 |
| 10182 | 2/3 | 3.1 | 10.7 | 9.1 | 12.3 | 10 | 42 |
| 10181 | 1/1 | 3.0 | 10.0 | 9.6 | 10.8 | 13 | 38 |

Base membrane PP-4. Calculated mass gain assumes all void volume in the base membrane filled with the solution and that all the dissolved P4VP is cross-linked and held in place in the membrane. Performance tests were carried out at 100 kPa using 300 ppm NaCl solution. Fluxes are corrected to 25° C.

The results of these experiments again clearly indicate that evaporation of the solvent during formation of the membranes leads to the incorporation of a gel in the membranes. In the absence of evaporation no gel was incorporated.

As the weight fraction of methanol, the more volatile solvent, is increased so is the mass of incorporated polyelectrolyte gel. With no methanol present in the starting solution the 60 second evaporation stage is insufficient to remove a sufficient amount of DMF in order for a gelling reaction to occur (membrane 10185). With high methanol contents (membranes 10182 and 10181) mass gains of about 9% or some 70-80% of the theoretical maximum were obtained. These latter two membranes exhibit quite high fluxes and reasonable separations of NaCl as compared to other PP-4 based membranes made in the group (vide infra). (No tests were made to determine the asymmetry of these two membranes.)

Effect of Evaporation Time on Flux and Separation (300 ppm NaCl, 100 kPa)

It is desirable to regulate the degree of evaporation occurring during the formation of the gel-filled membranes. This is shown clearly in the results shown in FIG. 7 where a series of membranes was made using a 50/50 wt/wt mixture of MeOH/DMF, 2.5 wt % PVP, and 10 mol % DBX cross-linker. The only variant in the series of membranes was the evaporation time. A PP-4 base membrane was used throughout.

Figure 7:
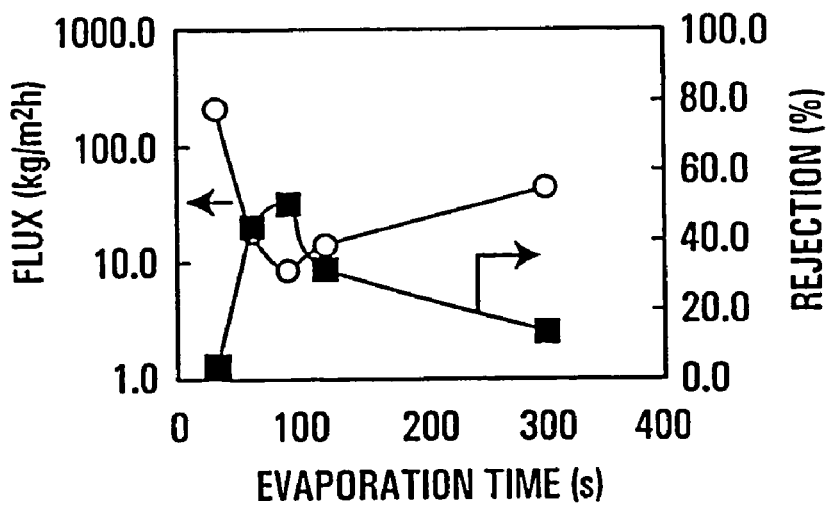
FIG. 7 is a graph showing flux and rejection as a function of evaporation time in a series of experiments in which solvent was allowed to evaporate for different time periods.

As can be seen from FIG. 7 the performance of the membranes depends on the evaporation time used in the process. Too short an evaporation time and the resulting membranes had a high flux but low rejection. Too long an evaporation and again there was an increase in flux and drop in rejection as compared to the membranes made with the intermediary evaporation times. The origin of these effects is not clear. At the higher fluxes it could be that concentration polarization contributes to the decline in separation. The absolute evaporation time will depend on the volatility of the solvent being removed, temperature, air-flow etc.

Extension of the Two Solvent Technique to Asymmetric Support Membrane

A set of membranes was prepared using identical starting solutions. (2.5 wt % P4VP; DBX 10 mol %; MeOH/DMF 50/50 wt/wt; 60 second evaporation; and 60 minute gelation time. Each of the membranes was reacted with benzyl bromide after gelation.) The membranes were prepared from PP-LA but differed in that evaporation from membrane #4171 was carried out from the side with the smaller pores while with #4172 evaporation took place from the side with the larger pores.

Each of these membranes was tested using a 300 ppm NaCl test solution at 100 kPa. Each membrane was tested with the evaporative facing and opposite the feed. The results are given in Table 6.

TABLE 6

Effect of support membrane and direction of feed

| Membrane Number | Support Membrane | Side for evaporation | Mass gain % | Evap. side toward feed | | Evap. side away from feed | |
|---|---|---|---|---|---|---|---|
| | | | | Flux (kg/m²h) | Rejct (%) | Flux (kg/m²h) | Rejct (%) |
| 4171 | PP-1A | small pore | 14 | 22.5 | 50 | 20 | 33 |
| 4172 | PP-1A | large pore | 11 | 30 | 20 | 31 | 47 |

Several factors stand out from these results. Membrane 4172 with its evaporative side away from the feed has an exceedingly high flux (31 (kg/m²h) at 100 kPa) with a rejection of NaCl close to 50%. This performance is exceptional as compared to high quality commercial nanofiltration membranes, vide infra.

Second, the PP-1A membranes exhibit a marked asymmetry in terms of performance in salt separation. Thus while the flux is the same for either membranes #4171 or 4172 irrespective of the way they were tested (evaporative side facing or opposite to the feed) there is a marked difference in separation. In both cases the largest separations were observed when the small pore sized face was facing the feed and independent of which side the evaporation was from during the evaporative step when the membrane was made.

These results are entirely consistent with an asymmetric loading of the gel within the pores, with the component of the gel providing the salt separation being located within the small-pore sized region of the base membrane. With this separating layer being at or close to the small pore sized surface of the membranes then good separations should result. With the feed coming from the large pore size side it would be expected that there would be a severe concentration polarization and loss of separation. We note that it is likely that there is some gel coating on the internal structural elements of the support throughout the thickness of the membrane. These coatings do not provide any salt separation function.

As solvent is evaporated from an asymmetric support membrane capillary forces should lead to the remaining solution being largely concentrated in the small pore sized region of the membrane. As the gelling reaction occurs with loss of methanol and an enhanced rate of the cross-linking reaction, this will lead to the separating layer being preferably located in the small pore size region of the support membrane.

This finding is important in that a considerable number of microporous membranes have asymmetric structures with one surface of the membrane having a smaller pore size. It also means that the evaporation could be allowed to occur from both sides of the membrane, something which could be a significant advantage in an industrial process.

Direct Evidence of the Distribution of Gel within the Pores

Figure 9:
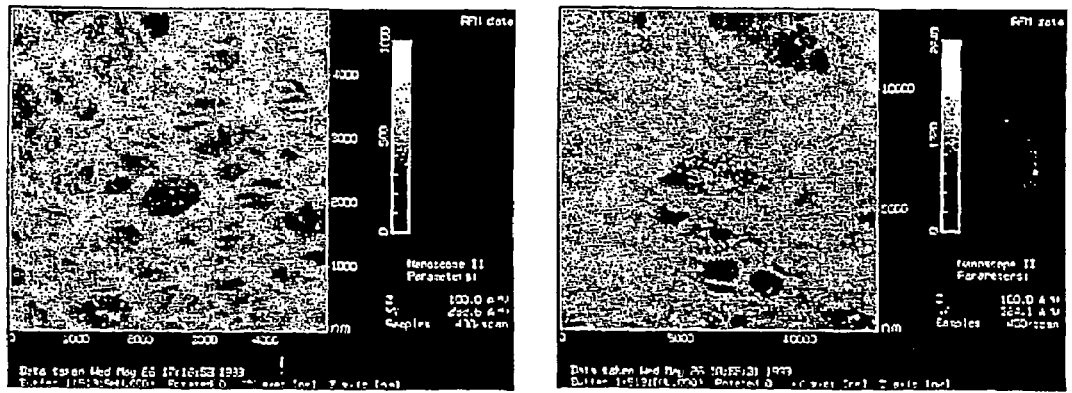
FIG. 9 shows AFM images of two sides of an asymmetric membrane of the invention.

Atomic Force Microscopy was used to examine both surfaces of a membrane formed using PP-1A as the substrate. The images were obtained using wet membranes and are shown in FIG. 9. The chlorine content of both surfaces of a membrane using EDX analysis with an Environmental Scanning Electron Microscope (ESEM) instrument. Chlorine was found on both the surfaces from which the evaporation occurred as well as the bottom surface facing the support. The ratio of chlorine on the two surfaces was different with the bottom surface appearing to have some 25% more chlorine present although this difference is barely outside the error limits of the experiment. (Cl/C ratio for membrane 5131 were—top 0.16/0.07 and bottom 0.20/0.02.)

As there was chlorine present on both surfaces it would seem that during the evaporation some residual gel is left as a coating on the fibrils/nodules of the side of the support membrane from which the evaporation took place.

Comparison of the Performance of the Asymmetrically and Symmetrically Filled Membranes As was shown earlier, the concentration of the starting polymer (P4VP) used in this work were generally below the overlap concentration and as such it is impossible to prepare gel-filled membranes without the concentration step associated with evaporation. This makes comparison of symmetrically and asymmetrically filled membranes somewhat difficult. In order to get round this the invention used a higher P4VP concentration to prepare symmetrically filled membranes. Separation depends on the gel-polymer concentration at the surface of the membrane facing the feed. With an asymmetric loading this concentration will be higher than the calculated value based on an even filling of the membrane.

The two series of membranes shown in Table 7 were prepared and tested. In the evaporative route a 60 second evaporation time was used. The gelling time in each case was set at 60 minutes. In each case a MeOH/DMF ratio of 50/50 wt/wt and a cross-linking ratio of 10 mol % were used. In the case of the asymmetric membrane based on PP-1A the small pore size face was towards the feed.

TABLE 7

Comparison of symmetrically and asymmetrically filled membranes

| Membrane # | P4VP sol (wt %) | Method | Base membrane | Mass gain (%) | Flux (kg/m$^2$h) | Reject (%) (300 ppm NaCl) |
|---|---|---|---|---|---|---|
| 4215 | 2.5 | Evap | PP-4 | 8.5 | 10 | 52 |
| 4213 | 2.5 | Evap | PP-4 | 9 | 19 | 43 |
| 4173 | 2.5 | Evap | PP-4 | 7 | 11 | 46 |
| 4214 | 5 | No evap | PP-4 | 10 | 3.2 | 52 |
| 4171 | 2.5 | Evap | PP-1A | 14 | 23 | 50 |
| 4172 | 2.5 | Evap | PP-1A | 11 | 31 | 47 |
| 4211 | 5 | No evap | PP-1A | 18 | 6 | 54 |

In the case of the PP-4 based membrane it can be seen that membranes 4215 and 4214 have identical rejections of sodium chloride but fluxes which differ by a factor of three. The higher flux is with the asymmetrically filled membrane prepared by the evaporative route.

In the case of the PP-1A based membranes the difference in flux is between a factor of 4 and 5 with comparable separation to the symmetrically filled membrane.

These results clearly demonstrate the superior performance of asymmetrically filled membranes as compared to symmetric gel-filled membranes.

Performance Measures of the Asymmetrically Gel Filled Membranes

The flux and separation of a typical membrane was examined as a function of pressure. The membrane was produced with a 3.1 wt % solution of P4VP in MeOH/DMF (50/50 wt/wt), with DBX as cross-linker (10.5 mol %) using a 60 second evaporation step and 60 minute gelling time. The membrane was tested with a 300 ppm NaCl solution with both flux and separation being measured as a function of pressure. The results are summarized in FIG. 10.

Figure 10:
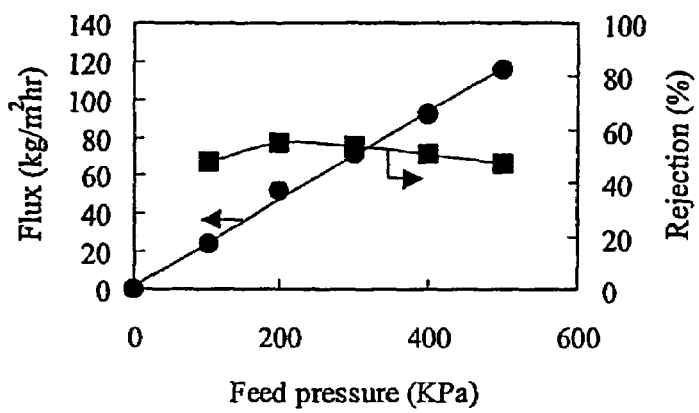
FIG. 10 is a graph showing flux and NaCl rejection as a function of feed pressure with a membrane of the invention.

As can be seen from the data summarized in FIG. 10 the flux of the membrane varies linearly with the applied pressure up to a value of 500 kPa. These results indicate that there is no compressible surface layer present on the membrane and that the gel is not affected by the large hydraulic flows encountered at the higher pressures.

The observed slight decrease of the rejection of NaCl by the membrane at higher pressures is likely arising from concentration polarization at the high flow rates accompanying the higher pressures.

The performance of an asymmetrically filled membrane in tap water softening was compared to that of several symmetrically filled membranes prepared in our group and with Desal-51, a high performance, flat-sheet nanofiltration membrane produced by Osmonics. The results of this comparison are given in Table 8.

TABLE 8

Comparison of performance in softening of municipal tap water

| Membrane # | Fabrication method | Mass gain (%) | Cross linking (%) | Flux (kg/m²h) | Rejection (%) | | |
|---|---|---|---|---|---|---|---|
| | | | | | Na$^+$ | Mg$^{++}$ | Ca$^{++}$ |
| 5133 | Evaporative | 12 | 10 | 22 | 21 | 79 | 63 |
| AK | Filling | 42 | 5 | 12 | 35 | 79 | 63 |
| AM | Filling | 66 | 11 | 8 | 20 | 74 | 61 |
| Desal-51 | — | — | — | 7 | 21 | 71 | 54 |

AK is the best symmetrically filled membrane product using PP-3 as the substrate with poly(vinylbenzylammonium salt) gel.
AM is a comparable membrane produced using a poly(vinylpyridinium salt) gel.
Membrane 5133 was made using a 60 second evaporation time.

The data clearly shows that the rejection of ions by the asymmetrically filled membrane is the same as that found for other gel-filled membranes produced in our group. However, there is a marked improvement in flux. As compared to the commercial membrane the asymmetrically filled membrane tested here shows a three-fold enhancement in flux with a better rejection of bivalent ions than the Desal-51.

Photochemically Induced In-Situ Polymerisation in the Presence of a Light Absorber It is possible to make symmetrically filled membranes by photo-polymerising a suitable monomer and cross-linking agent contained in the pores of a microporous membrane. Thus irradiating a poly(propylene) microporous membrane containing 4-vinylpyridine (VP), divinylbenzene (DVB), and 2,2-dimethoxy-2-phenylacetophenone (DMPA) as a photo-sensitizer with 350 nm wavelength light gives a symmetrically pore-filled membrane containing cross-linked poly(4-vinylpyridine) (PVP). Under these conditions light penetrates through the thickness of the membrane resulting in polymerisation of the incorporated monomers throughout its depth.

Control of the depth of penetration of the light should determine where polymerisation (pore-filling) occurs in a membrane. In this example we added a light absorbing material to the system and controlled the concentration of this species so as to regulate the depth of penetration of the incident light into the membrane. The choice of light absorber, or photo-blocker, is made on the basis of portion of the spectrum (wavelength) to be blocked, the extinction coefficient of the potential absorber molecules at this wavelength, and the absence of any adverse photo-reactions or involvement in the polymerisation reactions by the absorber. In the present case 350 nm wavelength light is used. The DMPA initiator has a strong absorbance at this wavelength.

We chose to use 2,2'-dihydroxy-4,4'dimethoxybenzophenone (DDB) as the photo-blocker. This compound has a strong absorption at the desired 350 nm.

A series of membranes were produced in which varying amounts of DDB were added to the solutions impregnating the membranes. Following the polymerisation step the membranes were treated with benzyl bromide in order to alkylate the pyridine nitrogen atoms and convert the pore-filling to a polyelectrolyte gel. These membranes were examined in terms of the physical properties, such as mass load, thickness, etc., morphology, and performance in pressure driven separations. Several different supporting microporous poly (propylene) supports were used.

Figure 11:
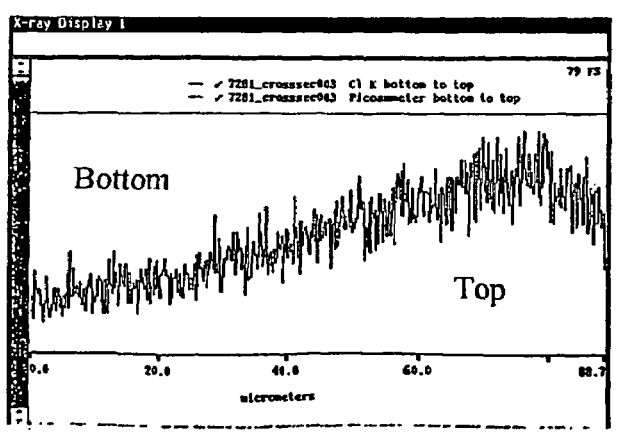
FIGS. 11 and 12 are energy dispersive X-ray analysis (EDX) (chlorine) line profiles of cross sections of an asymmetric membrane of the invention prepared by photochemically induced polymerization in the presence of a light absorber.

Cross-sections of membranes in the chloride form were analysed for chlorine using energy-dispersive X-ray analysis (EDX). As can be seen in FIG. 11, the membranes showed a marked asymmetry in the distribution of gel incorporated into the host membrane with the highest densities being at the side of the membrane facing the light. The incorporated gel is located within the pores and it does not form a surface layer.

The effect of changing the concentration of the photo-blocker DDB on mass load and membrane performance was examined. Data obtained with a PP-1A base membrane are given in Table 9. The results shown in this Table were obtained using identical conditions and irradiation times. The only variant was the concentration of DDB. Assuming that DDB exhibits a linear concentration/absorbance relationship it is possible to calculate the depth in the membrane at which the light intensity will be reduced to 1% of that of the incident light. This is shown in the Table as a percentage. (No absorber would be 100%, i.e. all the light goes through the membrane, 25% means that only 1% of the light intensity remains at a quarter of the way through the membrane.)

TABLE 9

Effect of UV blocker on degree of incorporation and performance of PP-1a based membranes[a]

| Membrane # | DDB (wt %) | Light penetration (%) | Mass gain % | Flux at 100 kPa (kg/m²h) | Separation 300 ppm Nacl (%) |
|---|---|---|---|---|---|
| 7271 | 1.8 | 50 | 64 | 0.8 | 52 |
| 7281 | 3.2 | 25 | 15 | 2.7 | 55 |
| 8041 | 5 | 17 | 8 | 42.5 | 8 |

[a]The membranes were produced with the small pore sized face of the membrane towards the light source. The membranes were treated with benzyl bromide after the photo-polymerisation reaction in order to induce a positive charge. The mass gains refer to the membrane after this alkylation step.

The results shown in Table 9 clearly indicate that increasing the relative concentration and thereby decreasing the nominal depth penetration of the light reduces the mass gain. As would be expected, we have also found that with a fixed DDB concentration increasing the length of the irradiation increases the amount of PVP incorporated into the membrane.

The EDX profile, FIG. 11, discussed above, shows that membrane #7281 has an asymmetric distribution of gel within the pores. The effect of this asymmetry is shown in the relative performances of the membranes. As can be seen membrane #7281, which has only a quarter of the mass gain of membrane 7271, has a flux which is 3.5 times as large as the latter membrane with the same, or even slightly increased separation. It is also evident from the results that too low a mass gain (membrane #8041) even with presumably a higher degree of asymmetry results in a high flux but low separation.

Figure 12:
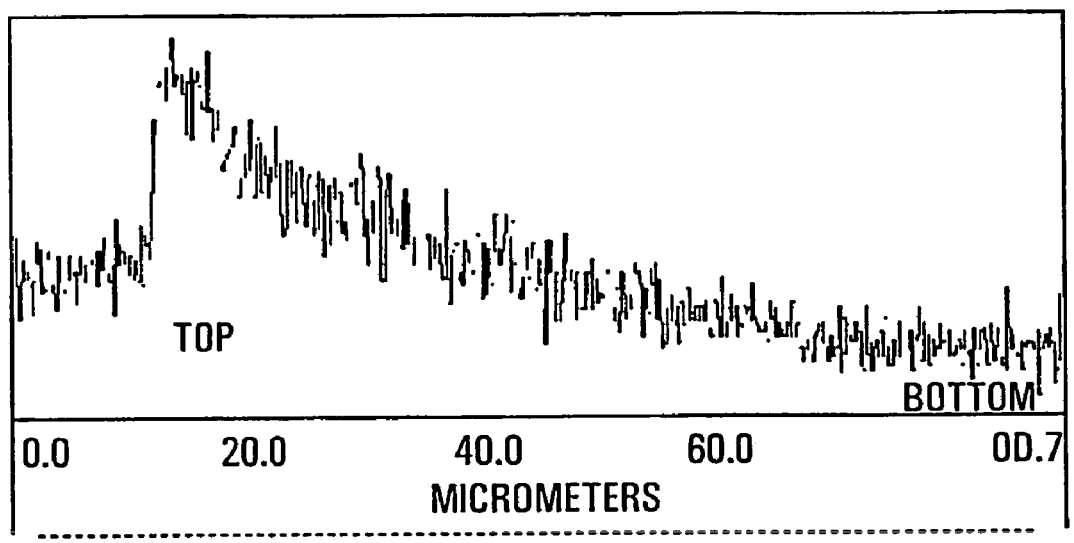
Figure 13:
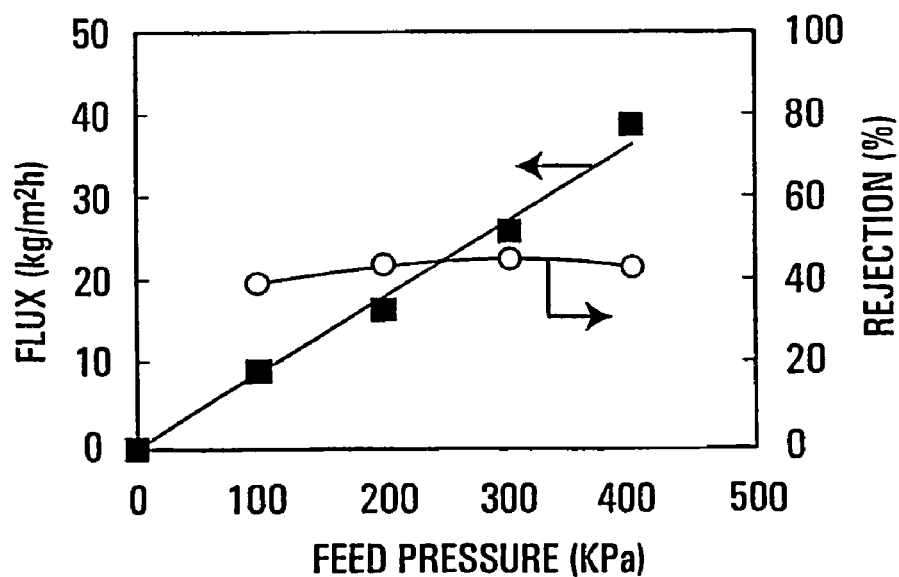
FIG. 13 is a graph showing flux and rejection as a function of feed pressure.

An asymmetrically filled membrane (#8175) was prepared and tested for water softening. The base membrane selected was PP-3 as this support typically gives high performance in this type of application. The DDB concentration in 4-vinylpyridine was adjusted for a 99% reduction in light intensity at a depth of 25% into the membrane. The membrane produced had a mass gain of 36% and a nominal degree of cross-linking with DVB of 20.2 wt %. The membrane was N-alkylated with benzyl chloride. The EDX profile of this membrane showed a marked asymmetry, FIG. 12. The two surfaces of the membrane appeared to be quite different when examined using ESEM as is shown in FIG. 13.

This membrane was tested with a 300 ppm NaCl test solution. With the more densely loaded surface towards the feed the effect of pressure on flux and separation was examined. The data shown in FIG. 13 shows that there is a linear relationship between flux and pressure up to 400 kPa with very little change in separation over the pressure range tested. The results are typical for a PVP filled membrane in which the gel volume fraction is relatively low.

The effect of inverting the membrane in the test cell is shown in Table 10. As can be seen when the bottom, or lightly filled surface of the membrane faces the feed the observed flux at 100 kPa is increased and the separation decreased. The reduction in separation is consistent with results obtained with other asymmetrically filled membranes where a marked concentration polarisation effect is seen in comparable situations. It is not clear at this point why the flux should also change as the membrane is reversed in the cell. It may be that there is a compressible surface layer on the "filled side" of the membrane but this is not proven at this point.

TABLE 10

Effect of change of membrane side facing feed on performance (Membrane 8175)

| Side facing feed | Flux (100 kPa) (kg/m²h) | Rejection (300 ppm NaCl) % |
| --- | --- | --- |
| densely filled | 14 | 48 |
| lightly filled | 33 | 16 |

The membrane was tested for its performance in water softening using municipal tap water as feed. The results are shown in Table 11. In the tests with the asymmetric membrane 8175 the filled side was towards the feed.

TABLE 11

Comparison of Asymmetric Membrane Performance

| Membrane | Flux at 100 kPa (kg/m²h) | Rejection (%) Na | Mg | Ca |
| --- | --- | --- | --- | --- |
| 8175 | 11 | 25 | 65 | 57 |
| symmetric P4VP | 8 | 20 | 74 | 61 |
| Desal-51 | 7 | 21 | 71 | 54 |

The first point to observe in the data in Table 11 is that the asymmetric membrane is capable of softening water at a reasonably high flux. Comparison with Desal-51 shows it has a significantly higher flux with a separation performance which is a little poorer.

Comparison was also made with a symmetrically filled PVP membrane. However, it is difficult to make such a comparison of performance because the PVP membranes were prepared by a different route and the mode of preparation has been shown to affect performance. The comparison made in Table 11 is with optimised P4VP gel-containing membranes. Again a significant improvement in flux of the asymmetrically-filled over the symmetrically-filled membrane is observed.

A microporous poly(propylene) (PP) microfiltration membrane (3M Company) containing an asymmetric loading of cross-linked poly(acrylic acid) was prepared. The PP substrate had a bubble point diameter of 0.57 μm with a porosity of 84.5% and an average thickness of 72 μm. Pore-filled membranes containing grafted poly(acrylic acid) have been previously described by Winnik, F. M.; Morneau, A.; Mika, A. M.; Childs, R. F.; Roig, A.; Molins, E.; Ziolo, R. F.; Can. J. Chem. 1998, 76, (1998), 10-17, the disclosure of which is incorporated herein by reference. These membranes were made by a photografting process with no cross-linking and are thus different from the cross-linked poly(acrylic acid) gels described here. While these photografted membranes had different surface compositions cross-sections of membranes containing iron oxide nanoparticles examined using scanning transmission electron microscopy showed that they had an essentially even distribution of poly(acrylic acid) through the thickness of the membrane.

Figure 16:
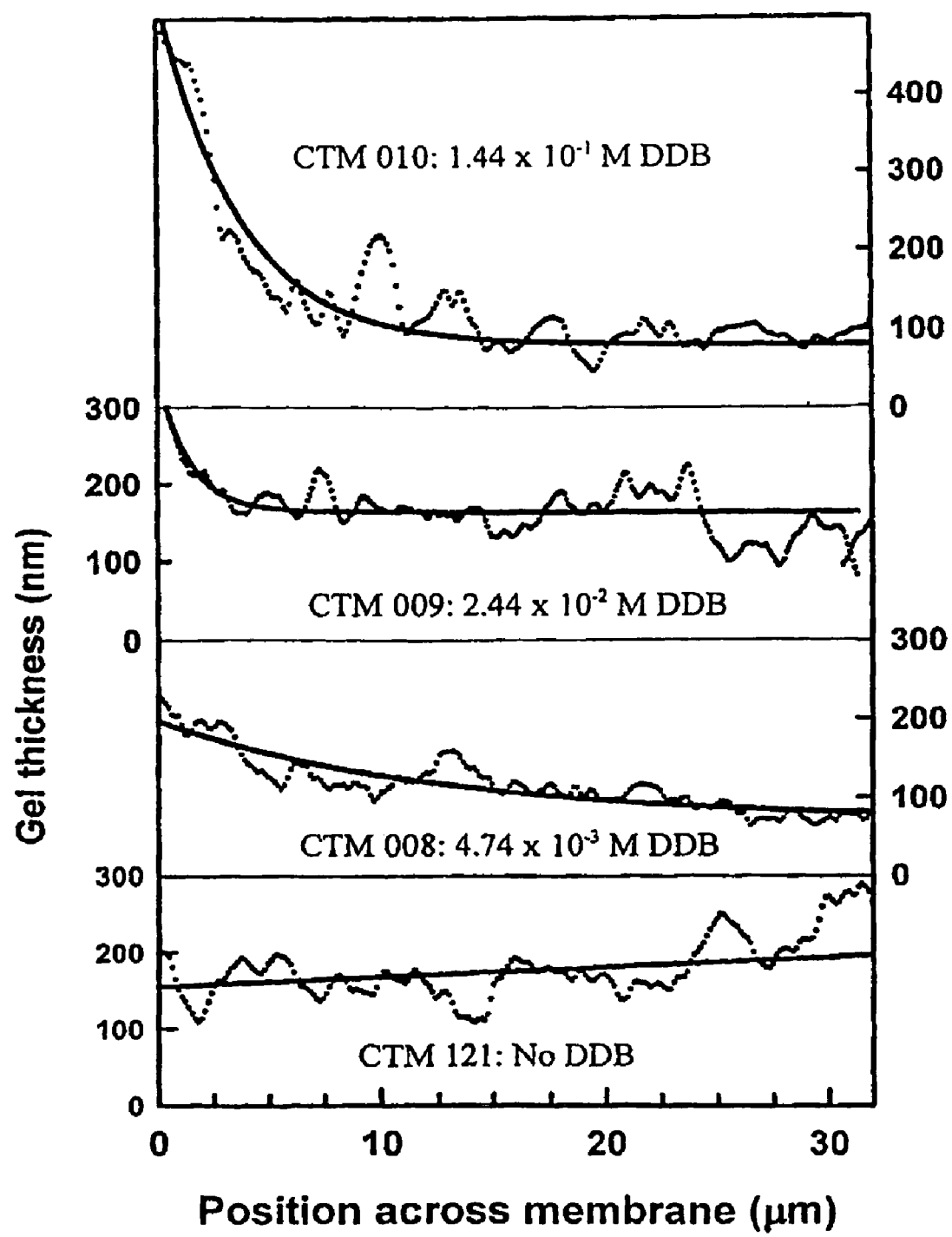
FIG. 16 is a graph of poly(acrylic acid) gel profiles of membranes prepared with differing quantities of photoblocker.

The asymmetric poly(acrylic acid) gel containing membranes of this invention were prepared by photopolymerization of acrylic acid with N,N-methylene bisacrylamide as crosslinker in DMF as a solvent and benzoin ethyl ether (1 to 1.5% by weight). DDB was used as photoblocker at various concentrations (0 to $1.44 \times 10^{-1}$ M) as indicated in FIG. 16. Under these conditions the light intensity is attenuated through the thickness of the membrane in a manner that was thought could lead to an asymmetric distribution of poly(acrylic acid) across the membrane as discussed in Koprinarov et al. (J. Phys. Chem. B 106(2002)5358-5364)

Figure 14:
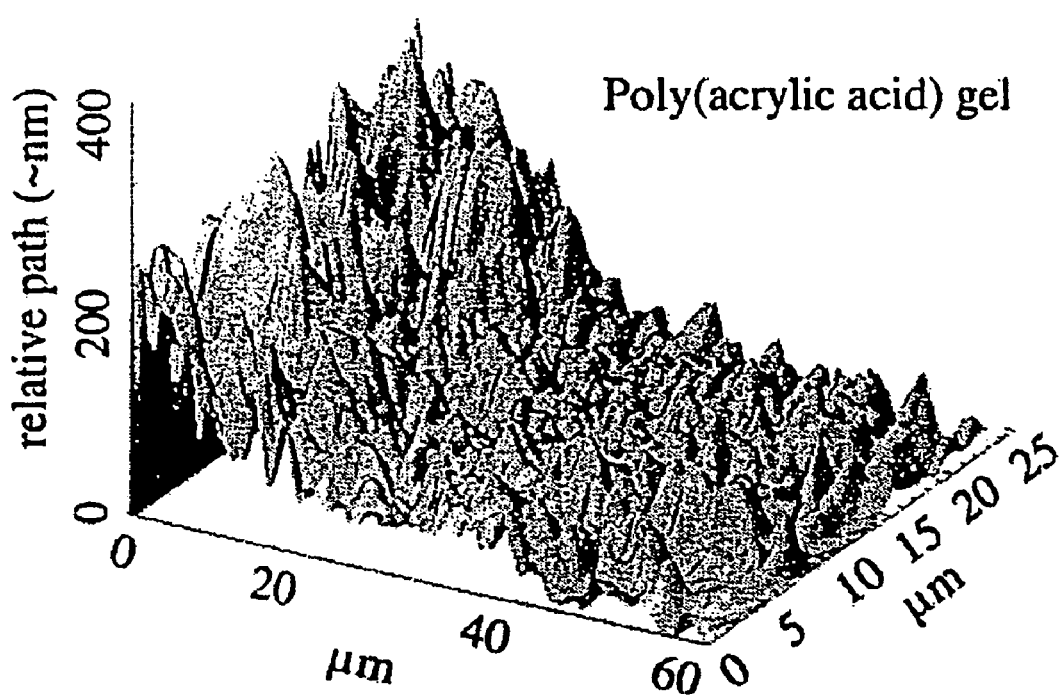
FIG. 14 is a three dimensional plot showing distribution of poly(acrylic acid) gel in a membrane of the invention.
Figure 15:
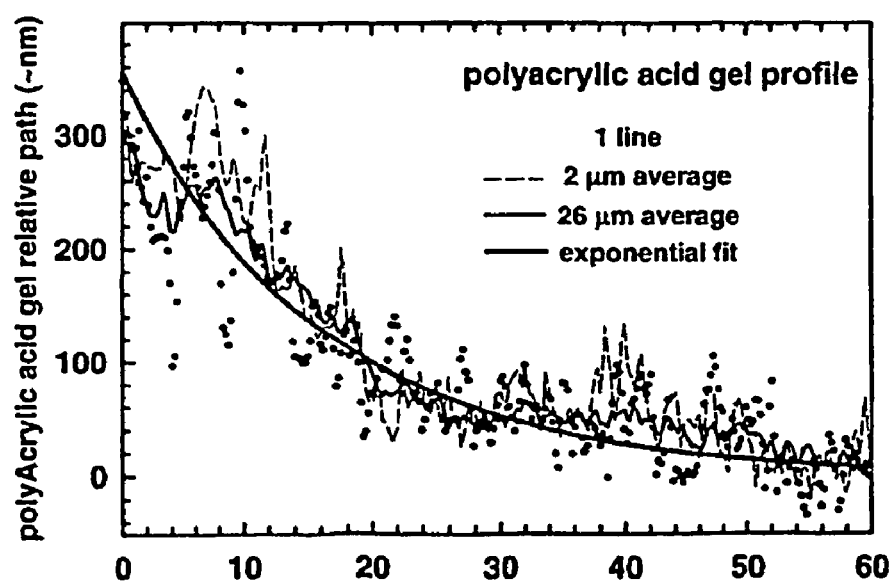
FIG. 15 is a graph showing the profile of poly(acrylic acid) gel across the membrane of FIG. 15.

A wet membrane was frozen at −120° C., cryomicrotomed to approximately 300 nm thickness and the cross-section examined with a scanning transmission X-ray microscope (STXM), as described by Koprinarov, I. N.; Hitchcok, A. P.; McCrory, C. T.; and Childs, R. F.; J. Phys. Chem. B 2002, 106, 5358-5364, the disclosure of which is incorporated herein by reference. Singular value decomposition (SVD) was used to obtain component maps from sets of X-ray spectromicroscopy images. FIG. 14 is an obtained poly (acrylic acid) component map derived from SVD of 11-images, 15-point-smoothed and presented as a three-dimensional plot. This clearly shows the pronounced gradient across the membrane. FIG. 15 is a profile of poly(acrylic acid) gel determined from a single vertical line (points), averaged over 2 µm (dashed line), and averaged over the full 26 µm width sampled (light solid line). The thick solid line is a single-exponential fit to the average over the full width. The decay constant is 0.07 µm$^{-1}$.

FIG. 16 shows gel profiles of asymmetric membranes prepared using different quantities of DDB photoblocker. The microporous substrate was a poly(propylene) microfiltration (3M Company) produced by the thermally induced phase separation process of Lloyd, D.R., et al., "Microporous Membrane Formation Via Thermally Induced Phase Separation.I.Solid-Liquid Phase Separation", J. Membr. Sci., 52 (1990) 239-261. The microporous substrate had an average porosity of 80.5% and an average thickness of 72 µm. Polypropylene substrate was soaked for a few minutes in N,N-dimethylformamide solutions of 2.775 M acrylic acid, 5 mol % N,N-methylenebisacrylamide, 2 mol % of 2,2-dimethoxy-2-phenylacetophenone (DMPA) and differing quantities of 2,2'-dihydroxy-4,4'-dimethoxybenzophenone (DDB) photoblocker.

A series of membranes were examined by STXM. Results are given in FIG. 16 for samples prepared with varying quantities of DDB, namely 0; 4.74×10$^{-3}$ M; 2.44×10$^{-2}$ M and 1.44×10$^{-1}$ M. FIG. 16 shows normalized gel profiles across the first 30 microns of the membranes. The solid lines represent exponential fits of the data. It is clear that as the concentration of DDB increases the distribution of the poly(acrylic acid) gel becomes more asymmetric. The densest area is at the surface exposed to the UV radiation, while the least dense is furthest away. CTM010 shows a particularly desirable feature in the rapid fall off in gel density, where the gel density decreases by a factor greater than 5 in the first 10 microns of the membrane and then reaches a low value.

The invention claimed is:

1. An asymmetric membrane comprising a microporous membrane substrate, in at least some of whose pores is contained a crosslinked gel which forms a continuous or substantially continuous layer, the density of the crosslinked gel being greater at or adjacent to a first major surface of the membrane than the density at or adjacent to a second major surface of the membrane.

2. A membrane according to claim 1, wherein at least some of the pores contain a cross-linked gel such that it forms a continuous or substantially continuous layer whose thickness is less than that of the microporous membrane substrate and is adjacent to the first major surface of the microporous membrane substrate.

3. A membrane according to claim 1, wherein the gel forming the continuous pore-filling band is not chemically bonded to the microporous membrane substrate but is entangled with the structural elements of the support.

4. A membrane according to claim 1, wherein the density of crosslinked gel polymer is at a maximum at or adjacent to the first major surface of the membrane and decreases gradually towards the second major surface of the membrane.

5. A membrane according to claim 1, wherein the membrane substrate is a microporous polyethylene, polypropylene, poly(vinylidenedifluoride), poly(tetrafluoroethylene), cellulose, cellulose acetate, nylon, poly(ester), polysulfone, or polycarbonate, or a porous ceramic or glass membrane support having a thickness of from 1 to 500 µm, preferably in the range of 10 to 200 µm, more preferably in the range 20 to 150 µm, a pore diameter in the range of 0.05 to 20 µm, preferably in the range 0.1 to 10 µm, more preferably 0.2 to 2 µm, and a pore volume of about 25% to about 95%, preferably in the range of 60 to 85%.

6. A membrane according to claim 1, wherein pores are of different sizes, with larger pores adjacent to one of the major surfaces of the substrate and smaller pores adjacent to the other major surface.

7. A membrane according to claim 1, wherein the crosslinked gel is a polyelectrolyte gel.

8. A membrane according to claim 7, wherein the crosslinked polyelectrolyte is based on one or more of 4-vinylpyridine, 2-vinylpyridine, acrylic acid, methacrylic acid, styrenesulfonic acid, vinylsulfonic acid, acrylamidomethylpropanesulfonic acid, diallylamine, N,N-dimethyldiallylamine, allylamine, N-(dimethylaminoethyl)-acrylamide, N,N-dimethylaminopropyl-methacrylamide), vinylbenzylamine or polyethyleneimine and their derivatives.

9. A membrane according to claim 1, wherein the crosslinked gel is a hydrogel.

10. A membrane according to claim 9, wherein the crosslinked hydrogel is based on crosslinked poly(vinyl alcohol), poly(acrylamide), poly(N-vinylpyrrolidone), poly (ethylene glycol) or poly(propylene glycol).

11. A membrane according to claim 1, which displays a rejection ratio of 1.5 or greater.

12. A process for preparing an asymmetric membrane according to claim 1, wherein the pores of the microporous substrate are filled with a solution of a polymer, or a polymerizable monomer, that bears functional groups and a crosslinking agent, whereafter some of the solvent is allowed to evaporate and crosslinking or polymerization and crosslinking, is allowed to proceed in the pores to form the asymmetric membrane.

13. A process according to claim 12, wherein the functional groups present on the polymer or on the polymerizable monomer are ionically charged groups or groups that can be rendered ionically chargeable.

14. A process according to claim 12, wherein evaporation from one major surface of the substrate is permitted while the other major surface is sealed to prevent evaporation.

15. A process according to claim 12, wherein the microporous substrate has pores of different sizes, with larger pores adjacent to one major surface of the substrate and smaller pores adjacent to the other major surface of the substrate.

16. A process according to claim 12, wherein evaporation is permitted from that major surface to which the larger pores are adjacent.

17. A process according to claim 15, wherein evaporation from both major surfaces of the microporous substrate is permitted.

18. A process according to claim 12, wherein the polymer is poly(4-vinylpyridine) or poly(acrylic acid) and the solvent is N,N-dimethylformamide or N-methylpyrrolidone.

19. A process according to claim 18, wherein the solvent is N,N-dimethylformamide, in admixture with methanol.

20. A process according to claim 12, wherein the polymer is a polyamine and the crosslinking agent is a dihalide or a diepoxide.

21. A process according to claim 20, wherein the polyamine is poly(4-vinylpyridine) or poly(ethylimine) and the crosslinking agent is α,α'-dibromoxylene, α,α'-dichloroxylene or 1,3-dibromopropane.

22. A process according to claim 20, wherein the polymer is poly(ethyleneimine) and the solvent is an isopropanol/methanol mixture.

23. A process according to claim 12, wherein the polymer is poly(vinylbenzylchloride) and the crosslinking agent is a di- or polyamine.

24. A process according to claim 23, wherein the di- or polyamine is 1,6-diaminohexane, piperazine or 1,4-diazabicyclo[2.2.3]octane.

25. A process according to claim 12, wherein the polymer is poly(vinyl alcohol) and the crosslinking agent is glutaraldehyde.

26. A process for preparing an asymmetric membrane according to claim 1, which comprises filling the pores of the microporous substrate with a solution of a polymerizable monomer that bears functional groups, a crosslinking agent, a photoinitiator for polymerization and a photoblocker, and irradiating to cause polymerization to form the asymmetric membrane.

27. A process according to claim 26, wherein the functional groups are ionically charged groups or groups that can be rendered ionically chargeable.

28. A process according to claim 26, wherein the polymerizable monomer is 4-vinylpyridine or acrylic acid, the photoinitiator is 2,2'-dimethoxy-2-phenylacetophenone, the photoblocker is 2',2-dihydroxy-4,4'-dimethoxybenzophenone and the solvent is N,N-dimethylformamide.

29. A separation process which comprises passing a liquid containing matter through a membrane according to claim 1 to separate some or all of the matter from the liquid.

30. A process according to claim 29, wherein multivalent cations are separated from the liquid.

31. A process according to claim 29, wherein monovalent cations are separated from the liquid.

32. A process according to claim 29, which is operated at pressure below 300 kPa.

33. A process according to claim 29, which is operated at a pressure below 100 kPa.

* * * * *